(12) United States Patent
Mittal et al.

(10) Patent No.: US 10,205,666 B2
(45) Date of Patent: Feb. 12, 2019

(54) END-TO-END FLOW CONTROL IN SYSTEM ON CHIP INTERCONNECTS

(71) Applicant: Ampere Computing LLC, Santa Clara, CA (US)

(72) Inventors: Millind Mittal, Palo Alto, CA (US); Phil Mitchell, San Jose, CA (US)

(73) Assignee: AMPERE COMPUTING LLC, Santa Clara, CA (US)

( * ) Notice: Subject to any disclaimer, the term of this patent is extended or adjusted under 35 U.S.C. 154(b) by 353 days.

(21) Appl. No.: 13/953,059

(22) Filed: Jul. 29, 2013

(65) Prior Publication Data
US 2015/0032794 A1   Jan. 29, 2015

(51) Int. Cl.
*H04L 12/819* (2013.01)
*H04L 12/851* (2013.01)

(52) U.S. Cl.
CPC ........ *H04L 47/215* (2013.01); *H04L 47/2408* (2013.01)

(58) Field of Classification Search
CPC . H04L 47/215; H04L 47/2408; H04L 12/433; H04L 12/422; H04L 12/42; H04L 12/4637
USPC .................. 709/251, 202; 370/450, 452, 455
See application file for complete search history.

(56) References Cited

U.S. PATENT DOCUMENTS

| | | | | |
|---|---|---|---|---|
| 4,404,557 A | * | 9/1983 | Grow | H04L 12/433 370/455 |
| 4,707,830 A | * | 11/1987 | Ulug | H04L 12/417 370/454 |
| 4,726,018 A | * | 2/1988 | Bux | H04L 12/433 370/455 |
| 4,731,784 A | * | 3/1988 | Keller | H04L 12/28 370/452 |
| 4,736,368 A | * | 4/1988 | Szczepanek | H04L 12/433 370/455 |
| 4,860,191 A | * | 8/1989 | Nomura | G06F 9/3879 710/110 |
| 4,943,959 A | * | 7/1990 | Arnold | H04L 12/40143 370/455 |
| 5,001,472 A | * | 3/1991 | Fischer | H04L 12/417 370/450 |
| 5,005,167 A | * | 4/1991 | Arthurs | H04L 12/28 398/54 |
| 5,229,993 A | * | 7/1993 | Foudriat | H04L 12/2852 370/445 |
| 5,274,637 A | * | 12/1993 | Sakamura | H04L 12/433 370/455 |
| 5,301,333 A | * | 4/1994 | Lee | G06F 13/364 370/370 |

(Continued)

*Primary Examiner* — Philip J Chea
*Assistant Examiner* — Wing Ma
(74) *Attorney, Agent, or Firm* — Alston & Bird LLP

(57) ABSTRACT

Provided is an end-to-end flow control management for a system on chip interface. As tokens are injected into agents arranged in a computer network the input point for the token is dynamically changed such that tokens are not always injected into the same agent. Additionally or alternatively, as tokens are injected into a token ring, the tokens are initially not activated until a predetermined event occurs (e.g., after a specific number of hops). Additionally or alternatively, also provided is a free pool manager that can keep at least some high priority slots available by consuming lower priority slots first.

20 Claims, 11 Drawing Sheets

(56) References Cited

U.S. PATENT DOCUMENTS

| | | | | |
|---|---|---|---|---|
| 5,388,097 A * | 2/1995 | Baugher | H04L 12/433 | 370/455 |
| 5,418,785 A * | 5/1995 | Olshansky | H04J 14/0227 | 370/438 |
| 5,528,594 A * | 6/1996 | Butter | H04L 12/433 | 370/258 |
| 5,566,177 A * | 10/1996 | Bhandari | H04L 12/40143 | 370/452 |
| 5,596,576 A * | 1/1997 | Milito | H04L 47/10 | 370/232 |
| 5,751,715 A * | 5/1998 | Chan | H04L 12/433 | 370/452 |
| 5,787,258 A * | 7/1998 | Costa | G06F 13/4252 | 709/208 |
| 5,838,687 A * | 11/1998 | Ramfelt | H04L 12/2852 | 370/443 |
| 5,890,001 A * | 3/1999 | Hall | G06F 9/4881 | 370/431 |
| 5,960,002 A * | 9/1999 | Ramfelt | H04L 12/2852 | 370/450 |
| 5,982,780 A * | 11/1999 | Bohm | H04L 12/6418 | 370/450 |
| 6,026,092 A * | 2/2000 | Abu-Amara | H04B 7/18584 | 370/388 |
| 6,337,865 B1 * | 1/2002 | Seto | H04L 12/417 | 370/450 |
| 6,426,962 B1 * | 7/2002 | Cabezas | H04L 1/205 | 370/516 |
| 6,523,102 B1 | 2/2003 | Dye et al. | | |
| 6,700,899 B1 * | 3/2004 | Cao | H04L 12/433 | 370/450 |
| 6,760,309 B1 * | 7/2004 | Rochberger | H04L 29/06027 | 370/229 |
| 6,829,649 B1 * | 12/2004 | Shorey | H04L 12/5693 | 709/235 |
| 6,952,401 B1 * | 10/2005 | Kadambi | H04L 47/125 | 370/232 |
| 6,965,933 B2 * | 11/2005 | Haartsen | H04L 12/4015 | 370/400 |
| 7,103,008 B2 * | 9/2006 | Greenblat | G06F 15/78 | 370/258 |
| 7,310,670 B1 * | 12/2007 | Walbeck | H04B 3/54 | 709/225 |
| 7,898,960 B2 * | 3/2011 | Yashima | H04L 12/5693 | 370/235.1 |
| 8,117,213 B1 | 2/2012 | Nakano et al. | | |
| 8,190,593 B1 * | 5/2012 | Dean | G06F 17/30864 | 707/707 |
| 8,195,888 B2 | 6/2012 | Solihin | | |
| 8,380,915 B2 | 2/2013 | Wood et al. | | |
| 8,392,661 B1 | 3/2013 | Metcalf | | |
| 8,515,434 B1 * | 8/2013 | Narendran | H04W 48/02 | 370/230 |
| 8,521,930 B1 * | 8/2013 | Meyers | G06F 13/22 | 710/107 |
| 2002/0152060 A1 * | 10/2002 | Tseng | G06F 13/22 | 703/17 |
| 2003/0140109 A1 * | 7/2003 | Pospesel | H04L 12/433 | 709/208 |
| 2003/0227932 A1 * | 12/2003 | Meempat | H04L 49/101 | 370/415 |
| 2004/0037306 A1 * | 2/2004 | Khan | H04L 12/5695 | 370/437 |
| 2004/0057453 A1 * | 3/2004 | Montgomery, Jr. | H04J 3/085 | 370/452 |
| 2004/0081079 A1 * | 4/2004 | Forest | H03M 13/43 | 370/216 |
| 2004/0085979 A1 * | 5/2004 | Lee | H04L 49/101 | 370/412 |
| 2004/0213276 A1 * | 10/2004 | Yamada | H04L 12/5602 | 370/412 |
| 2005/0102125 A1 * | 5/2005 | Tseng | G06F 13/22 | 703/14 |
| 2005/0120102 A1 * | 6/2005 | Gandhi | H04L 47/10 | 709/223 |
| 2005/0138254 A1 * | 6/2005 | Raghavan | G06F 13/37 | 710/240 |
| 2005/0207427 A1 * | 9/2005 | Su | H04J 14/0227 | 370/400 |
| 2005/0207440 A1 * | 9/2005 | Tyan | H04J 14/0227 | 370/454 |
| 2005/0207755 A1 * | 9/2005 | Rabbat | H04J 14/0227 | 398/59 |
| 2005/0220102 A1 * | 10/2005 | Tschudin | H04L 45/566 | 370/389 |
| 2005/0246340 A1 * | 11/2005 | Smith | G06F 13/362 | |
| 2006/0227801 A1 * | 10/2006 | Nanda | H04L 12/5695 | 370/447 |
| 2006/0268871 A1 * | 11/2006 | Van Zijst | H04L 47/125 | 370/390 |
| 2007/0229226 A1 * | 10/2007 | Soleimani | H04W 74/00 | 340/10.2 |
| 2007/0294447 A1 * | 12/2007 | Nozaki | G06F 13/1642 | 710/240 |
| 2007/0294448 A1 * | 12/2007 | Nozaki | G06F 13/1642 | 710/240 |
| 2008/0107020 A1 * | 5/2008 | Trinh | H04L 12/5693 | 370/229 |
| 2008/0159315 A1 * | 7/2008 | Chrysos | H04L 12/433 | 370/403 |
| 2008/0176577 A1 * | 7/2008 | Bourlas | H04L 5/023 | 455/454 |
| 2008/0222235 A1 * | 9/2008 | Hurst | H04N 7/17336 | 709/201 |
| 2009/0055909 A1 * | 2/2009 | Cheng | H04W 74/02 | 726/6 |
| 2009/0089602 A1 * | 4/2009 | Bose | G06F 1/206 | 713/340 |
| 2010/0097969 A1 * | 4/2010 | De Kimpe | H04W 52/0216 | 370/311 |
| 2010/0228848 A1 * | 9/2010 | Kis | H04L 12/4637 | 709/223 |
| 2011/0188507 A1 * | 8/2011 | Watts | H04L 12/56 | 370/401 |
| 2011/0271277 A1 * | 11/2011 | Hussain | G06F 9/5077 | 718/1 |
| 2011/0305208 A1 * | 12/2011 | Wu | H04W 72/1247 | 370/329 |
| 2012/0110281 A1 * | 5/2012 | Green | G06F 3/062 | 711/154 |
| 2012/0236764 A1 * | 9/2012 | Kono | H04L 12/66 | 370/276 |
| 2013/0170506 A1 * | 7/2013 | Boucard | H04L 47/215 | 370/475 |
| 2013/0191612 A1 * | 7/2013 | Li | G06T 15/005 | 712/30 |
| 2013/0242742 A1 * | 9/2013 | Nishimura | H04L 47/20 | 370/235.1 |
| 2013/0295948 A1 * | 11/2013 | Ye | H04W 72/0453 | 455/452.1 |
| 2014/0143558 A1 * | 5/2014 | Kuesel | G06F 1/26 | 713/300 |
| 2014/0172811 A1 * | 6/2014 | Green | H04L 67/06 | 707/705 |
| 2014/0279905 A1 * | 9/2014 | Muniswamy-Reddy | G06F 11/20 | 707/639 |
| 2014/0372646 A1 * | 12/2014 | Salisbury | G06F 13/362 | 710/110 |
| 2015/0007189 A1 * | 1/2015 | De Gruijl | G06F 9/5016 | 718/104 |
| 2015/0019680 A1 * | 1/2015 | Darcy | H04L 67/1097 | 709/214 |

* cited by examiner

END-TO-END FLOW CONTROL IN SYSTEM ON CHIP INTERCONNECTS

TECHNICAL FIELD

The subject disclosure relates generally to system on chip interconnects and, also generally, to end-to-end flow control in system on chip interconnects.

BACKGROUND

With the advancements in computing technology and the prevalence of computing devices, the usage of integrated circuits, referred to as a system on a chip or system on chip (SoC), are commonly used. The SoC integrates most components of a computer, or another electronic system or electronic device, into a single chip. For example, a SoC might contain digital functions, analog functions, mixed-signal functions, radio-frequency functions, and so on, on single chip substrate. In an example, an application for a SoC is in the area of embedded systems.

In some systems with multiple agents, where several agents generate service requests that are to be processed by one service agent, in order to ensure that a service agent has storage space available to store incoming requests, storage slot (referred to simply as "slots") availability is provided to requesting agents. Credits or tokens are issued to requesting agents that might be connected with each other and the service agent in a ring topology (e.g., token ring). When the tokens are injected into the token ring by the service agent, the tokens are injected at the same requesting agent each time and, further, the tokens are active when injected into the token ring. Thus, the tokens can be consumed by agents that are located at the beginning of the token ring and agents located near the end of the token ring might rarely have the opportunity to obtain tokens.

Further, some systems use a hard partitioning scheme for the slots. For example, the slots are divided evenly between high priority, medium priority, and low priority requests. However, this is an inefficient use of resources because the low priority requests are more numerous than the higher priority requests and, therefore, the low priority requests might take over all the available slots. Since the slots are quickly filed with low priority requests, the availability of slots for high priority requests can be severely limited.

The above-described deficiencies of conventional approaches to flow control are merely intended to provide an overview of some of the problems of conventional approaches and techniques, and are not intended to be exhaustive. Other problems with conventional systems and techniques, and corresponding benefits of the various non-limiting embodiments described herein may become further apparent upon review of the following description.

SUMMARY

The following presents a simplified summary in order to provide a basic understanding of some aspects described herein. This summary is not an extensive overview of the disclosed subject matter. It is intended to neither identify key nor critical elements of the disclosure nor delineate the scope thereof. Its sole purpose is to present some concepts in a simplified form as a prelude to the more detailed description that is presented later.

An aspect relates to a system that includes a processor configured to select a first agent and a second agent from a plurality of agents in a computer network. The system also includes a token allocator configured to inject a first token into the first agent and a second token into the second agent. The first token and the second token comprise respective priority request identifiers and the processor is further configured to process the first token and the second token based on its priority request identifier.

Another aspect relates to a method that can include identifying a plurality of agents arranged in a computer network. The method can also include inserting a plurality of slot availability tokens into the plurality agents. The plurality of slot availability tokens can be inactive when inserted into the plurality of agents.

Still another aspect relates to a method that can include selecting a first agent and a second agent from a plurality of agents in a computer network. The method can also include injecting a first token into the first agent and a second token into the second agent. The first token and the second token can include respective priority request identifiers. The method can also include processing the first token and the second token based on its priority request identifier.

A further aspect relates to a computer program product that comprises a non-transitory medium storing programs for execution by one or more computing systems. The computer program product can comprise code for selecting a first agent and a second agent from a plurality of agents in a computer network. The computer program product can also comprise code for injecting a first token into the first agent and a second token into the second agent. The first token and the second token can comprise respective priority request identifiers. The computer program product can also include code for processing the first token and the second token based on its priority request identifier.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

Various non-limiting embodiments are further described with reference to the accompanying drawings in which.

DETAILED DESCRIPTION

In the following detailed description, reference is made to the accompanying drawings, which form a part hereof. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the disclosure, as generally described herein, and illustrated in the Figures, can be arranged, substituted, combined, separated, and designed in a wide variety of different configurations, all of which are explicitly contemplated herein.

Figure 1:
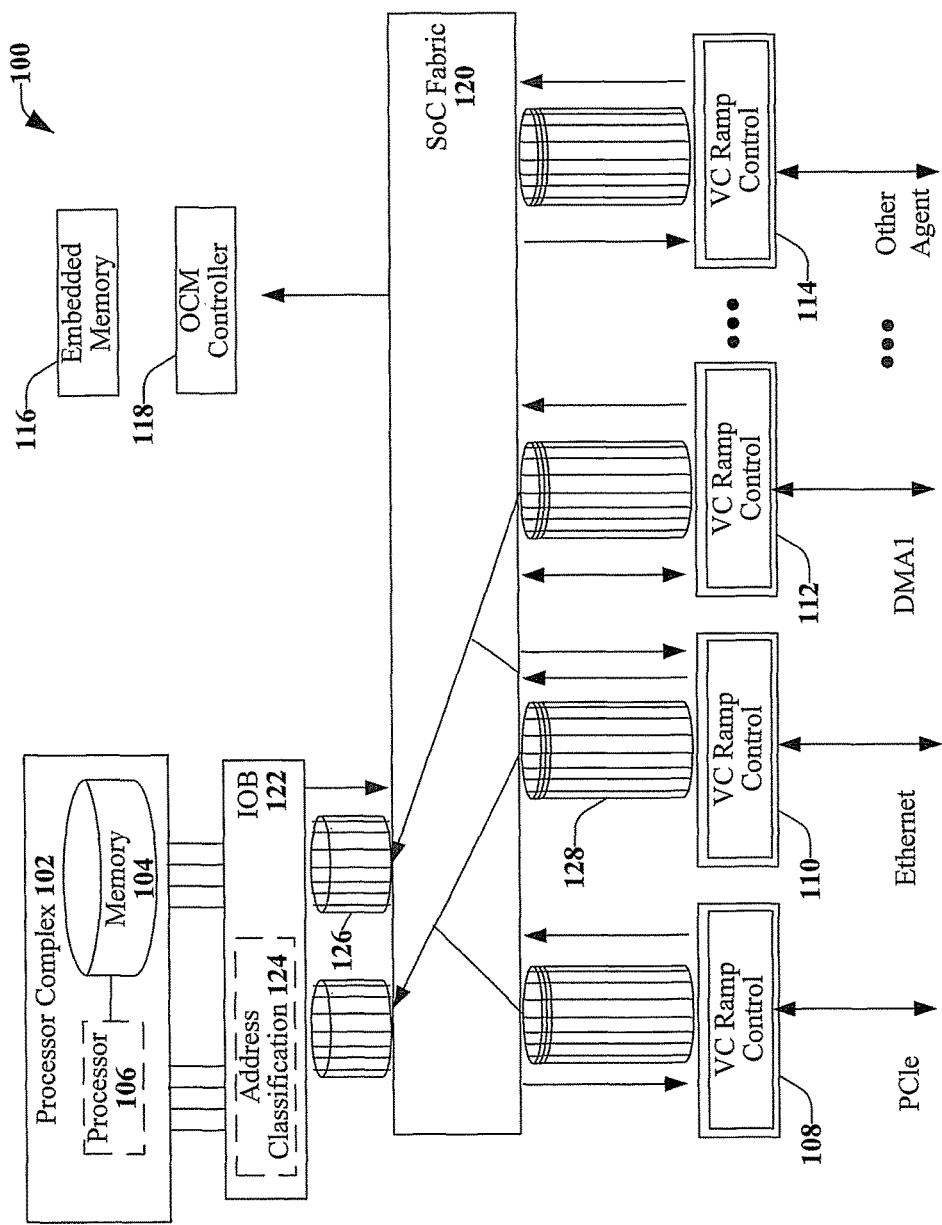
FIG. 1 illustrates an example, non-limiting embodiment of a network, according to an aspect.

FIG. 1 illustrates an example, non-limiting embodiment of a network 100, according to an aspect. Network 100 can include a processor complex 102, which can include at least one memory 104 that can store computer executable components and instructions. In an example the at least one memory 104 can be system memory. The processor complex 102 can also include at least one processor 106, communicatively coupled to the at least one memory 104. Coupling can include various communications including, but not limited to, direct communications, indirect communications, wired communications, and/or wireless communications. The at least one processor 106 can facilitate execution of the computer executable components stored in the at least one memory 104. The at least one processor 106 can be directly involved in the execution of the computer executable component(s), according to an aspect. Additionally or alternatively, the at least one processor 106 can be indirectly involved in the execution of the computer executable component(s). For example, the at least one processor 106 can direct one or more components to perform the operations.

It is noted that although one or more computer executable components may be described herein and illustrated as components separate from the at least one memory 104 (e.g., operatively connected to memory), in accordance with various embodiments, the one or more computer executable components could be stored in the at least one memory 104. Further, while various components may be illustrated as separate components, it will be appreciated that multiple components can be implemented as a single component, or a single component can be implemented as multiple components, without departing from example embodiments.

Network 100 can also include a plurality of agents, illustrated as a first agent 108, a second agent 110, a third agent 112, and a fourth agent 114. The plurality of agents are in a computer network. According to an implementation, the plurality of agents are connected in a ring topology, however, the plurality of agents can be connected in a different configuration according to other implementations. It should be understood that fewer or more agents could be utilized with the disclosed aspects. As illustrated, the agents can include a voltage controlled (VC) ramp control; however, according to some aspects, the one or more agents do not include a VC ramp control. Also, as illustrated, one or more agents can be connected to a peripheral component interchange express (PCIe), to the Ethernet; to direct memory access (DMA1); and/or to other agents.

Also included in network 100 can be embedded memory 116 and/or an on-chip memory (OCM) controller 118, for example. According to some aspects, external memory (not shown) can also be utilized with the network 100. For example, the external memory can be a double data rate (DDR) memory or another type of memory. Network 100 can also include one or more offload engines (not shown) and/or one or more external interfaces (not shown).

Also included in network 100 can be a system on chip (SoC) fabric 120 that can connect the agents to an input/output bridge (IOB 122). In an example, the SoC fabric 120 might use a first protocol and the processor complex 102 might use a second protocol. Therefore, the IOB 122 can be configured to convert the two different protocols to allow the SoC Fabric 120 and the processor complex 102 to communicate. The IOB 122 can include an address classification 124 module, which can operate in slave mode, for example. There can be channels between the SOC fabric 120, one of which is labeled as channel 126. These channels can be, for example, a 512 bit interface that operates at about 400 Mhz, wherein there can be one request per clock.

The SoC fabric 120 is a shared resource, and, therefore, the agents compete in time in order to gain access to the SoC fabric 120 and to send requests/receive responses from the processor complex 102. The latency from each agent to the system memory might be long (in relative terms). Due to the long latencies, there might be a large number of outstanding requests from each agent in order to mask the latency. Further, the requests from each agent (and requests across the multiple agents) might not be of the same type. Therefore, if the requests are not managed property, the class of service or quality of service necessary might not be achieved.

Illustrated between the agents and the SoC fabric 120 and the agents are virtual channels (VC), one of which is labeled as channel 128. In an implementation, there can be three virtual channels in each lane. For example, the SoC can send requests to the port control (PCP) traffic, which can support, for example, four classes of services. These classes of services can be identified as "Class 0", "Class 1", "Class 2", and "Class 3".

In this example, class 0 (VC0) can be a priority level 0 and can support high priority requests. In an example, Class 0 might not be used for large data. Class 0 might be used for low latency requests to memory (e.g., Cache Line refill or evictions). Class 1 can be a priority level 1 and is an important priority level. Class 1 (VC1) can be used for non-flow control traffic to memory (e.g., Ethernet). Class 2 (VC2) can be priority level 2 and can be used for normal, regulated bandwidth. Class 2 can be used if the traffic is below the provisioned bandwidth. If the Class 2 traffic does not obtain the necessary bandwidth through the network, the incoming point will overflow, and the data can be lost. Therefore, if the traffic is above the provisioned bandwidth, Class 3 (VC3) can be used. Class 3 is a priority 3 and can be used for the majority of the traffic (e.g., Best Effort traffic).

It is noted that although four classes of services are described herein, it should be understood that the disclosed aspects are not limited to four classes of services and fewer or more classes of services can be supported with the disclosed aspects.

For the PCP to SoC traffic, virtual channel support might not be provided. However, two priority levels ("Priority 0" and "Priority 1") might be supported, for example. The Priority 0 can be a high priority for all configuration reads/ writes. Strongly ordered accesses can be high priority. The Priority 1 can be a normal priority used for normal memory accesses.

As discussed above, there can be at least one type of traffic that can be latency sensitive. For example, there might be a cache or an agent that might be stalled until a read request is satisfied. Thus, this cache or agent cannot have a large number of outstanding requests because its read request is more sensitive and it is not processing enough requests to compensate for the long latencies. These latency sensitive requests are high priority and should go through even though other, low priority, requests might have been received earlier.

Therefore, according to an implementation, before submitting a request into the network, an agent should know there is a slot available at the processor complex for handling the request. This can be achieved by issuing credits or tokens to the agents. For example, if there are 120 slots available, then there are 120 tokens available for issuance to the agents. When the 120 tokens are all issued, there are no more tokens available. Each time a slot in a first-in-first-out (FIFO) memory chip in the IOB 122 is freed up, a token is made available to the agents (e.g., the token is reused).

Some systems inject a token into a token ring, wherein the token is injected at the same agent each time and, further, the token is active when it is injected into the token ring. Thus, the token can be consumed by an agent early in the token ring cycle and, therefore, tokens might rarely reach the agents at the end of the token ring cycle.

According to an implementation, the injection point for inserting tokens into the computer network (which for simplicity purposes will be referred to herein as a "token ring") is dynamically altered such that the tokens are not always input to the same agent. For example, a first token can be injected at a first agent, a second token can be injected at a second agent, a third token can be injected at a third agent, and so forth. In another example, a first token can be injected at a first agent, a second token can be injected at a third agent, a third token can be injected at a seventh agent, and so on. Thus, each agent (or different agents) can be provided an equal opportunity to consume a token.

Alternatively or additionally, according to an implementation, when injected into the token ring, the token is inactive until a predefined event occurs. For example, a first token can be active after 0 hops (e.g., activated when injected), a second token can be active after one hop (e.g., activated at a second agent), a third token can be active after two hops (e.g., activated at a third agent), and so forth.

The tokens can be sent by the agents with a request. For example, each token can include priority request identifiers. Each priority request identifier can indicate whether the respective token comprises a high priority request, a medium priority request, a low priority request, or any other priority request level. The at least one processor can be configured to process the tokens based on its priority request identifier. For example, each priority request identifier can comprise a priority request level and the processor can process each token in an order based on its priority request level. Further to this example, the processor can process the high priority request before the medium priority request or the low priority request. For example, there might be few high priority requests and a relatively large number of low priority requests. However, based on the identifiers (or other information) included with the token and associated request, the processor can handle the high priority requests without getting overloaded by trying to process the large number of low priority requests, which can be processed at a later time when the system is not as busy. Further, the high priority requests can be allocated additional memory slots such that high priority requests can be sent, even though low priority requests might no longer have memory slots and, at least temporarily, cannot be transmitted, as will be described below.

It is noted that although the various aspects are described with reference to a high priority request, a medium priority request, and/or a low priority request, the aspects are not limited to this implementation. Instead, the terms "high", "medium", and "low" are used for simplicity purposes and other manners of ranking the priority requests can be utilized with the disclosed aspects. Further, for simplicity purposes the high priority request is discussed as being processed before the other requests. However, other implementations can be utilized wherein a low or medium priority request is processed before a high priority request, depending on the ranking level implementation utilized.

As it relates to the availability of slots for the different classes of services, in some systems, there is one or more first-in-first-out (FIFO) memory chips (e.g., in the IOB 122) common for all classes of services. In this case, there is a possibility that the FIFO memory chip can fill up and no further requests can be received, even high priority requests. Thus, in some systems, there can be different FIFO memory chips for the different classes of services, wherein the FIFO memory chips are located at the arbitration points with the network. However, the multiple FIFO memory chips can create complexity and can increase costs.

Further, some systems use a hard partitioning for slots. For example, the slots are divided evenly between high priority, medium priority, and low priority. This can be an inefficient use of resources because the low priority requests, for example, might take over all the slots, which does not allow room for the high priority requests.

Therefore, according to an implementation, in the case where multiple classes of services are supported, such as four different classes of services, class 0 can be high priority; class 1 can be medium priority; class 2 can be normal/regulated bandwidth; and class 3 can be normal/low priority. In this case, the pool can be divided into four pools (e.g., by the at least one memory 104): a first pool for class 0, a second pool for class 0 and class 1, a third pool for class 0, class 1, and class 2, and a fourth pool (e.g., common pool) for all four classes. All priority levels use the fourth pool initially and, when the fourth pool is full, the low priority (class 3) does not inject any more traffic. Class 0, class 1, and class 2 continue to inject traffic until the third pool is full, at which time class 2 no longer injects traffic. Class 0 and class 1 can still inject traffic into the second pool. When the second pool is full, there can still be slots available in the first pool for the high priority, class 0, traffic. Thus, the high priority traffic is not blocked behind lower priority traffic. Further, the processor can handle the matters of high priority (e.g., class 0, class 1) without consuming resources for a large number of low priority matters (e.g., class 3, class 2).

According to an implementation, since pools can include different types of classes (e.g., a token that is associated with two different priority levels), two pieces of information are carried with the request and the token. The two pieces of information include the class to which the token belongs and the class for which the token has been used. For example, the information can indicate that the token belongs to VC0, but that the token has been used for VC2. Thus, when the token is freed by the IOB and made available for an agent, the token can be injected as a VC2 token (not the VC0 token for which it was previously used). In such a manner, low priority tokens can be consumed by the agents to send high priority traffic.

An overview of some of the embodiments for providing flow control for system on chip (SoC) interconnects has been presented above. As a roadmap for what follows next, various example, non-limiting embodiments and features for an implementation of end-to-end flow control are described in more detail. Then, a non-limiting implementation is given for a computing environment in which such embodiments and/or features may be implemented.

Figure 2:
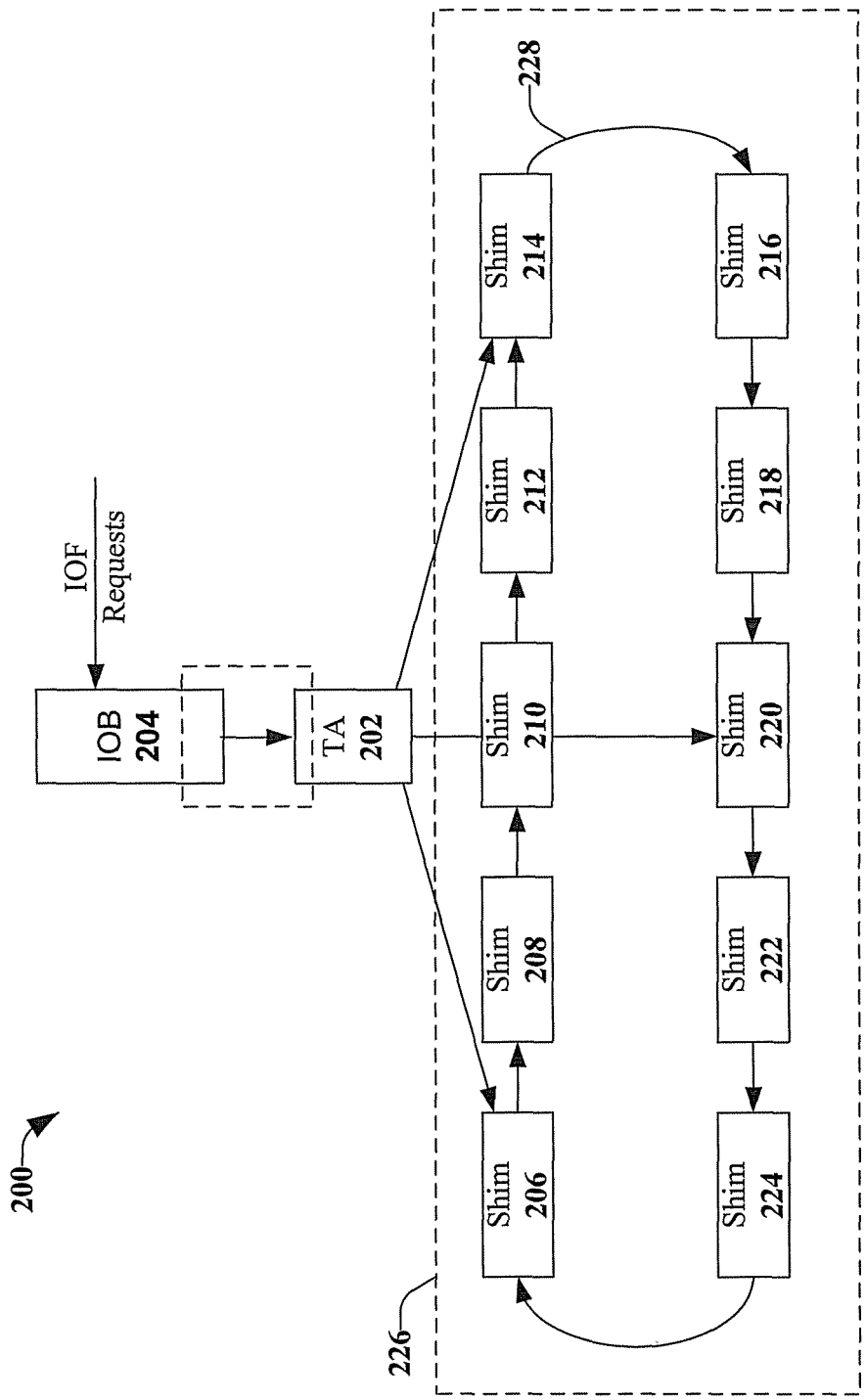
FIG. 2 illustrates an example, non-limiting schematic block-diagram for token allocation, according to an aspect.

FIG. 2 illustrates an example, non-limiting schematic block-diagram 200 for token allocation, according to an aspect. A token allocator (TA 202) can be located between an input/output bridge (IOB 204) and multiple shims. The multiple shims are labeled as a first shim 206, a second shim 208, a third shim 210, a fourth shim 212, a fifth shim 214, a sixth shim 216, a seventh shim 218, an eighth shim 220, a ninth shim 222, and a tenth shim 224. Although ten shims are illustrated and described herein, it should be understood that any number of shims could be utilized with the disclosed aspects. In addition, although illustrated in ring topology, the shims can be connected using a different type of configuration. Further, the shims might be referred to as master shims, AXI shims, AXI master shims, or APM shims herein. According to an implementation, the TA 202 can be located in the SoC Fabric 120 of FIG. 1. Further, the IOB 204 can be similar to IOB 122 of FIG. 1.

The TA 202 can be configured to receive tokens from the IOB 204 and can distribute the token to the shims 206-224. As illustrated in the example ring topology 226, a token ring 228 attaches the master shims 206-224 in a round-robin manner. A shim can forward a request to the IOB 204 when the shim has acquired a token from the token ring since the shim indicates that there is a slot available for the request.

System on chip interconnects can experience Head-of-Line (HOL), which is blocking that occurs when a lower priority request is at the head of the queue (or first in first out memory chip) and is being flow controlled. Higher priority requests are "blocked" until the lower priority requests can be received. In one or more embodiments, the disclosed aspects attempt to overcome the HOL issue by implanting source based flow control use of tokens. For example, according to an implementation, agents are only allowed to inject requests into the system on chip interconnect when the agent has acquired a token.

In a conventional system, the TA 202 injects the tokens at one shim, such as the first shim 206. If the first shim 206 does not need the token, the first shim 206 transfers the token to the second shim 208. If the second shim 208 does not need the token, the second shim 208 transfers the token to the third shim 210, and so forth through the token ring 228. If the tenth shim 224 does not need the token received from the ninth shim 222, the tenth shim 224 transfers to token back to the first shim 206, completing a first loop of the token ring 228. However, in most cases, the token is used early in the token ring 228 chain, which can be due in part to pre-fetching of tokens. Therefore, the ninth shim 222 and tenth shim 224 might rarely receive a forwarded token.

According to the disclosed aspects, the TA 202 can be configured to inject the token at multiple locations along the token ring 228. For example, the TA 202 can be configured to inject a first token into the first shim 206, a second token into the fifth shim 214, a third token into the eighth shim 220, and so forth. It is noted that the disclosed aspects are not limited to this example and the TA can be configured to inject the token into any of the shims, which might be a different shim than those illustrated and described herein. For example, the TA 202 can be configured to inject the first token into the fourth shim 212, the second token into the tenth shim 224, a third token into the sixth shim 216, and so on.

The ability to inject the tokens at different shims along the token ring 228 allows for fairness within the system. For example, if the tokens are always injected at the same shim (e.g., the first shim 206), the first few shims in the token ring 228 are favored since those shims always have the first opportunities to accept or reject the token (e.g., pass the token to the next shim in the token ring 228). Thus, injecting the token at different points can allow different shims to have the first opportunities to accept or reject the respective token.

The tokens can be injected into the token ring 228 in an active state. For example, according to conventional systems, the token is injected into the first shim 206 in an active state, which allows the first shim 206 to use the token, if needed. This also introduces unfairness because the first few shims in the token ring 228 have the first opportunities to accept or reject the token.

According to one or more aspects discussed herein, the token can be injected into the token ring in an inactive state. After an event occurs, the token can be activated (e.g., token becomes valid). In an implementation, the token can be associated with instructions, wherein the token is inactive until a certain number of hops (e.g., one or more hops) occur, wherein the event is the defined number of hops. For example, the instructions can indicate that the token is inactive until after three hops. Thus, if the token is injected in the first shim 206, the token will be transferred to the second shim 208 (first hop) and then transferred to the third shim 210 (second hop). When the token is transferred to the fourth shim 212 (third hop), the event occurs and the token is activated. As a result of the activation, the fourth shim 212 has the first opportunity to accept or reject the token, according to this example.

In another example, the inactivated token might be injected into the sixth shim 216 and the event that is used to activate the token might be a single hop. Therefore, the sixth shim 216 transfers the token to the seventh shim 218 and the token is activated by the event (e.g., one hop) and the seventh shim 218 can accept or pass along (e.g., reject) the token.

By injecting inactive tokens at a single shim (e.g., the first shim) or at different shims, fairness can be introduced since the same shims are not always presented with the first opportunities to accept or reject the tokens. According to an implementation, injecting active tokens can allow for bias within the token ring 228. For example, some agents might be considered to be more important than other agents and, therefore, injection of tokens and rules applied to activation of those tokens can be implemented in order to favor one or more agents over other agents.

In an implementation, the token ring can transmit various classes of tokens. For example, the token ring can transmit four classes of tokens, such as VC0 (Low Latency), VC1 (Guaranteed Bandwidth), VC2 (Provisioned Bandwidth), and VC3 (lowest priority). Although, the disclosed aspects are described with reference to four classes of services, the disclosed aspects are not limited to this implementation. Instead, the aspects disclosed herein can be extended to implementations that include fewer or more classes of services.

According to some aspects, there can be a plurality of shims connected to a core IOF. There can also be a number of shims connected to a standby IOF. In an implementation, there can be about twenty shims connected to the core IOF and about four shims connected to the standby IOF. It is noted that these numbers are for purposes of explaining the disclosed aspects and should not be construed as limiting since the various aspects can be extended to a different number of shims than described herein.

Table 1 below is an example, non-limiting representation of token ring identification assignments. Table 1 lists, for each AXI master shim, a Ring ID, which indicates the connection order in the token ring. An indication is also provided as to whether the AXI master shim is connected to the TA logic, wherein "Y" indicates that the shim is connected to the TA logic. Further, Table 1 lists the hop count for the respective shim. Further Ring ID 0's upstream connection is Ring ID 23 and Ring ID 0's downstream connection is Ring ID 1.

TABLE 1

| AXI Master Shim | Ring ID | TA I/F | TA Port | Hop Count |
|---|---|---|---|---|
| AHBC | 0 | | | 3 |
| CLE | 1 | | | 4 |
| COPS_0* | 2 | | | 5 |
| CTXMGR_0 | 3 | | | 6 |
| DMA | 4 | | | 7 |
| ENET_0 | 5 | | | 8 |
| ENET_1 | 6 | | | 9 |
| PCIE_0 | 7 | Y | 0 | 0 |
| PCIE_1 | 8 | | | 1 |
| PCIE_2 | 9 | | | 2 |
| PCIE_3* | 10 | | | 3 |
| PCIE_4* | 11 | | | 4 |
| QM_0 | 12 | | | 5 |
| QM_1 | 13 | | | 6 |
| SATA_2 | 14 | Y | 1 | 0 |
| SEC | 15 | | | 1 |
| USB_0 | 16 | | | 2 |
| USB_1 | 17 | | | 3 |
| XGENET_0* | 18 | | | 4 |
| XGENET_1* | 19 | | | 5 |
| ENET4 | 20 | | | 6 |
| GFC | 21 | Y | 2 | 0 |
| QMLite | 22 | | | 1 |
| SLIMpro | 23 | | | 2 |

In an implementation, the rings identified by an asterisk (*) in Table 1 might reside in power domains that may be powered down in some configurations. These identified Ring IDs might utilize a bypass mode that allows their upstream port to be connected to the next enabled downstream port.

The IOB (e.g., IOB 122 of FIG. 1 or IOB 204 of FIG. 2) can be configured to return one token every IOB clock cycle, according to an aspect. In an example, the clock cycle can be 1.2 Ghz. The tokens can be accumulated by the IOB by VC (e.g., VC Ramp Control of FIG. 1) and transferred into a clock domain (e.g., an AXI clock domain) of the IOB. According to an aspect, the IOB can have a 250 Mhz clock domain. At about the same time as the tokens have been received into the clock domain of the IOB, the tokens can be passed to the TA (e.g., TA 202 of FIG. 2). For example, the tokens can be passed to the TA through TA ports of the IOB.

The maximum rate that the IOB can return tokens to the TA logic can be determined by dividing the clock domain by the clock cycle. Thus, for a clock cycle of 1.2 Ghz and an IOB having a 250 Mhz clock domain, 4.8 tokens can be returned per clock cycle.

1.2 Ghz/250 Mhz=4.8 tokens per 250 Mhz clock

In order to support the maximum token return rate, while providing for some overhead, the IOB interface to the token allocation can be, for example, four bits wide for each VC channel. An example, non-limiting TA port list is defined according to Table 2 below.

TABLE 2

| Port Name | I/O | Description |
|---|---|---|
| vc0_token_valid | In | Strobe that signals VC0 tokens are being returned on the vc0_token_cnt input. 0b-No tokens being returned 1b-vc0_token_cnt tokens being returned |
| vc0_token_cnt[3:0] | In | Count VC0 tokens being returned. 0000b-Illegal 0001b-1 token 0010b-2 tokens : 1111b-15 Tokens |
| vc1_token_valid | In | Strobe that signals VC1 tokens are being returned on the vc1_token_cnt input. |
| vc1_token_cnt[3:0] | In | Count of VC1 tokens being returned. |
| vc2_token_valid | In | Strobe that signals VC2 tokens are being returned on the vc2_token_cnt input. |
| vc2_token_cnt[3:0] | In | Count of VC2 tokens being returned. |

Tokens can be made available to the shims through the token ring (e.g., token ring 228 of FIG. 2). As an example, three of the AXI shims, as indicated in Table 1, have ports connects to the TA logic. These ports can allow the TA to return tokens at three points within the token ring, according to this example. Table 3 below, describes example, non-limiting TA ports that interface to shims. The hop count ports define which shim can add new tokens to the ring and, therefore, can be eligible to claim the new tokens.

TABLE 3

| Port Name | I/O | Description |
|---|---|---|
| s<n>_vc0_token_valid | Out | Strobe that signals VC0 tokens are to added to the token ring beginning at AXI Shim Id <n>. Where <n> is 0, 1, or 2. 0b-No tokens being returned 1b-vc0_token_cnt tokens being returned |
| s<n>_vc0_token_cnt[3:0] | Out | Count VC0 tokens to be added. 0000b-Illegal 0001b-1 token 0010b-2 tokens : 1111b-15 Tokens |
| s<n>_vc1_token_valid | Out | Strobe that signals VC1 tokens are to added to the token ring beginning at AXI Shim Id 0. |
| s<n>_vc1_token_cnt[3:0] | Out | Count of VC1 tokens to be added. |
| s<n>_vc2_token_valid | Out | Strobe that signals VC1 tokens are to added to the token ring beginning at AXI Shim Id 0. |
| s<n>_vc2_token_cnt[3:0] | Out | Count of VC2 tokens to be added. |
| s<n>_hop_cnt[3:0] | Out | The Hop Count where tokens will be added (see Table 1 for details). |

It is noted that according to Table 3, the TA logic interfaces to three AXI shims and has three sets of interface ports to these shims. This is represented by the example of Table 3 by the s<n> prefix, where s<n> can be one of s0, s1, or s2.

The TA can have a simple round-robin arbitration scheme that selects one of the AXI shims with a TA port and computes a new hop count. At about the same time as tokens are received from the IO Bridge, the TA can select the next AXI shim in the token ring and can send new tokens to that shim.

Figure 3:
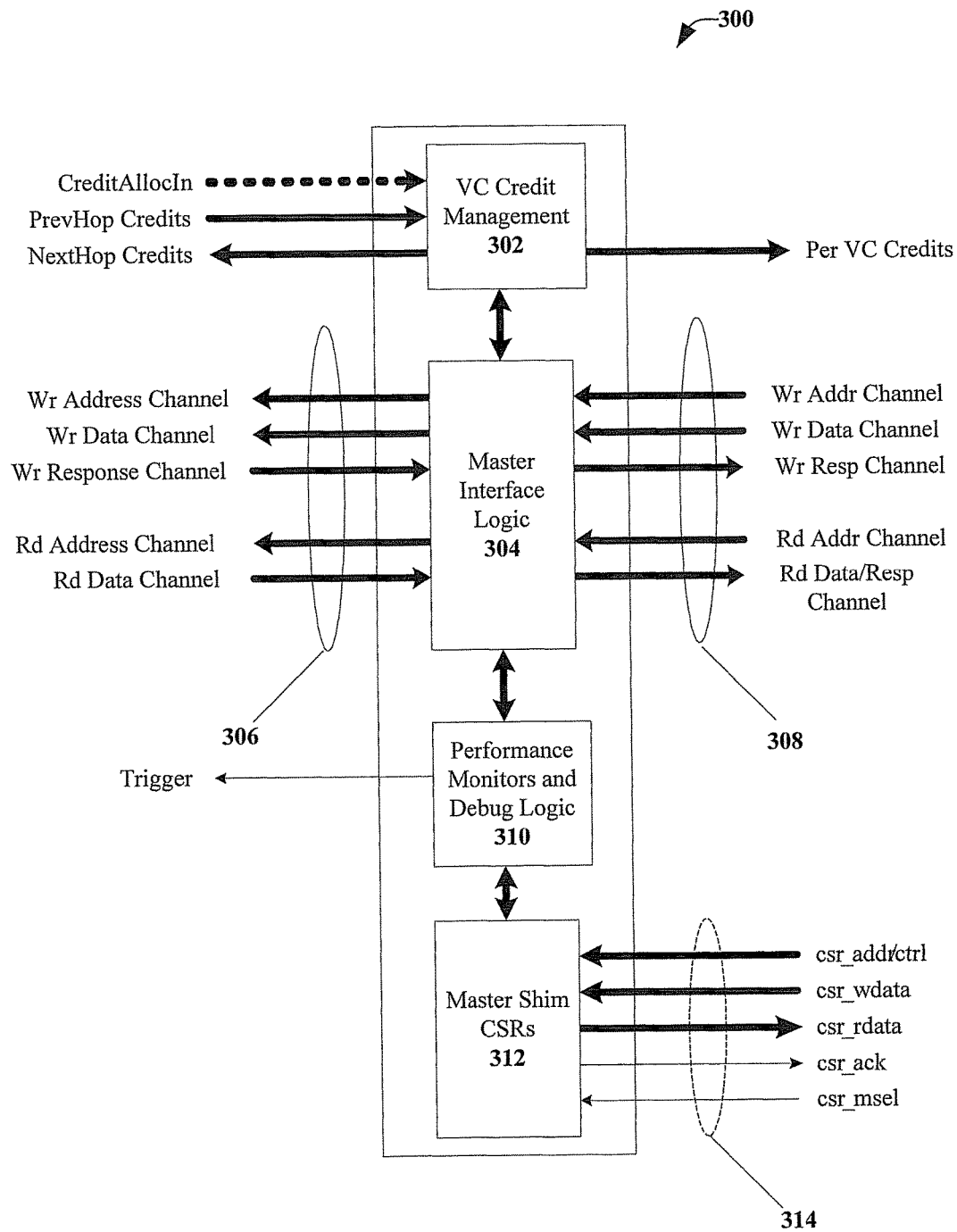
FIG. 3 illustrates an example, non-limiting representation of some interfaces and blocks in a shim, according to an aspect.

According to an implementation, the IOF AXI master shim can be located between the IOF AXI master interface and one or more AXI master devices. FIG. 3 illustrates an example, non-limiting representation of some interfaces and blocks in a shim 300 (e.g., an IOF AXI master shim), according to an aspect.

For example, the shim 300 can include VC Credit Management 302, which can receive credits (e.g., tokens) and output credits. For example, the VC Credit Management 302 can receive previous hop credits and can send next hop credits, according to an aspect.

Also included in shim 300 can be a master interface logic 304, which can interface with write (Wr) channels and read (Rd) channels. The left side indicates the IOF side AXI master interface 306 and the right side indicates the device side AXI master interface 308.

Shim 300 can also include performance monitors and debug logic 310. Also included are master shim CSRs 312. The oval indicates the Shim CSR interface 314. Shim 300 can also include other interfaces and blocks and the illustrated shim 300 is for purposes of explaining the disclosed aspects.

Figure 4:
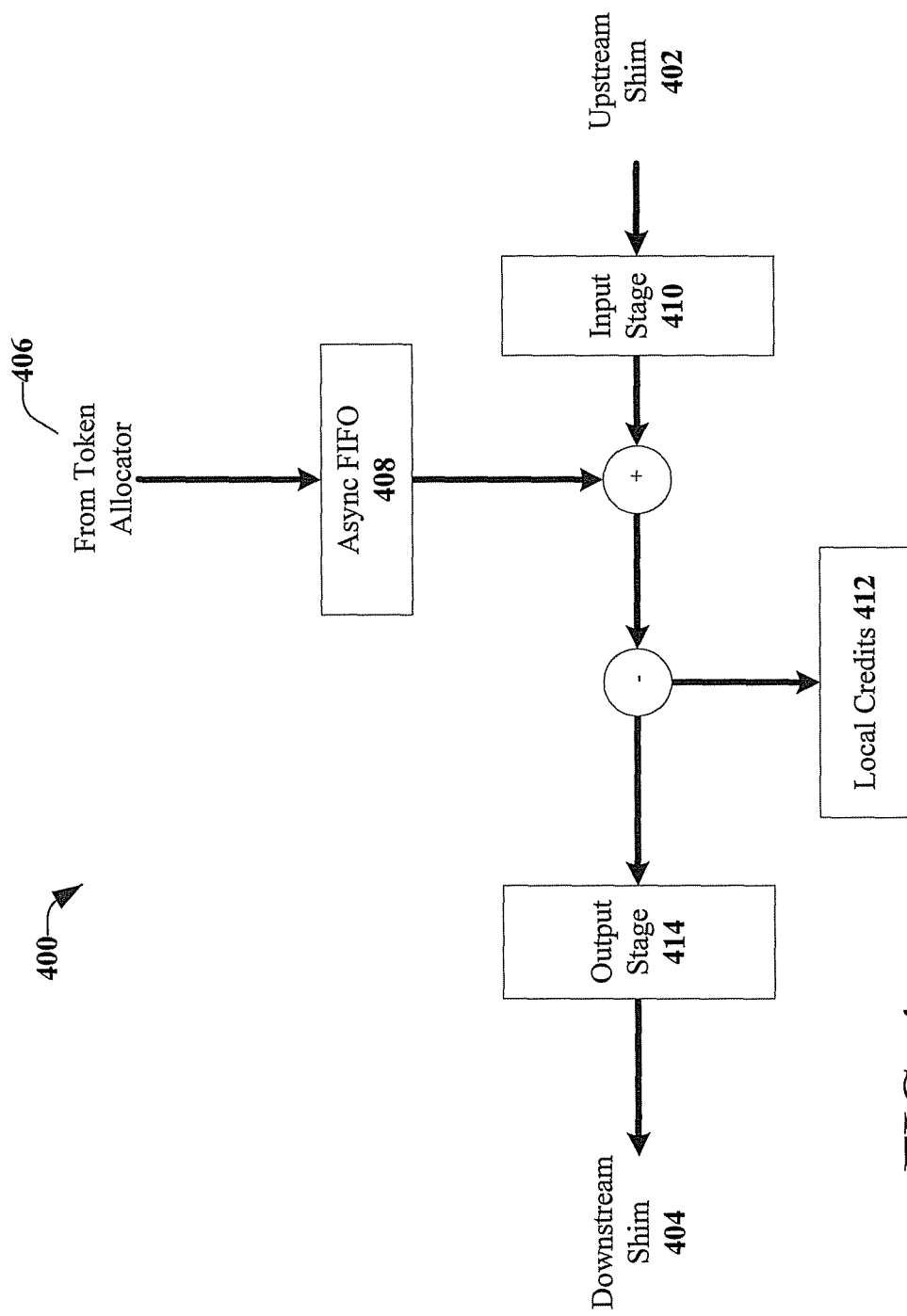
FIG. 4 illustrates an example, non-limiting shim credit management method, according to an aspect.

FIG. 4 illustrates an example, non-limiting shim credit management method 400, according to an aspect. One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

A function of the master shim (e.g., shim 300) can be to provide flow control of requests into the IO fabric for over-subscribed traffic. For example, the shim can provide resources to manage traffic destined to the I/O bridge. This capability can be enabled through the use of Virtual Channels (VCs) and VC tokens. A VC channel can carry send requests to the IO bridge when the shim has tokens for that VC.

According to an implementation, the VC credit management logic can be attached to upstream shims 402 and downstream shims 404 in a computer network. Selected master shims can also connect to the global TA logic. According to an implementation, the actual shims that are connected to the TA can be determined at about the same time as the system is designed.

Thus, tokens can be received from the TA 406, through an asynchronous FIFO memory chip 408, for example. Tokens might also be received from the upstream shim 402 through an input stage 410, for example. Credits are transmitted as local credits 412 or through an output stage 414 to the downstream shims 404.

Figure 5:
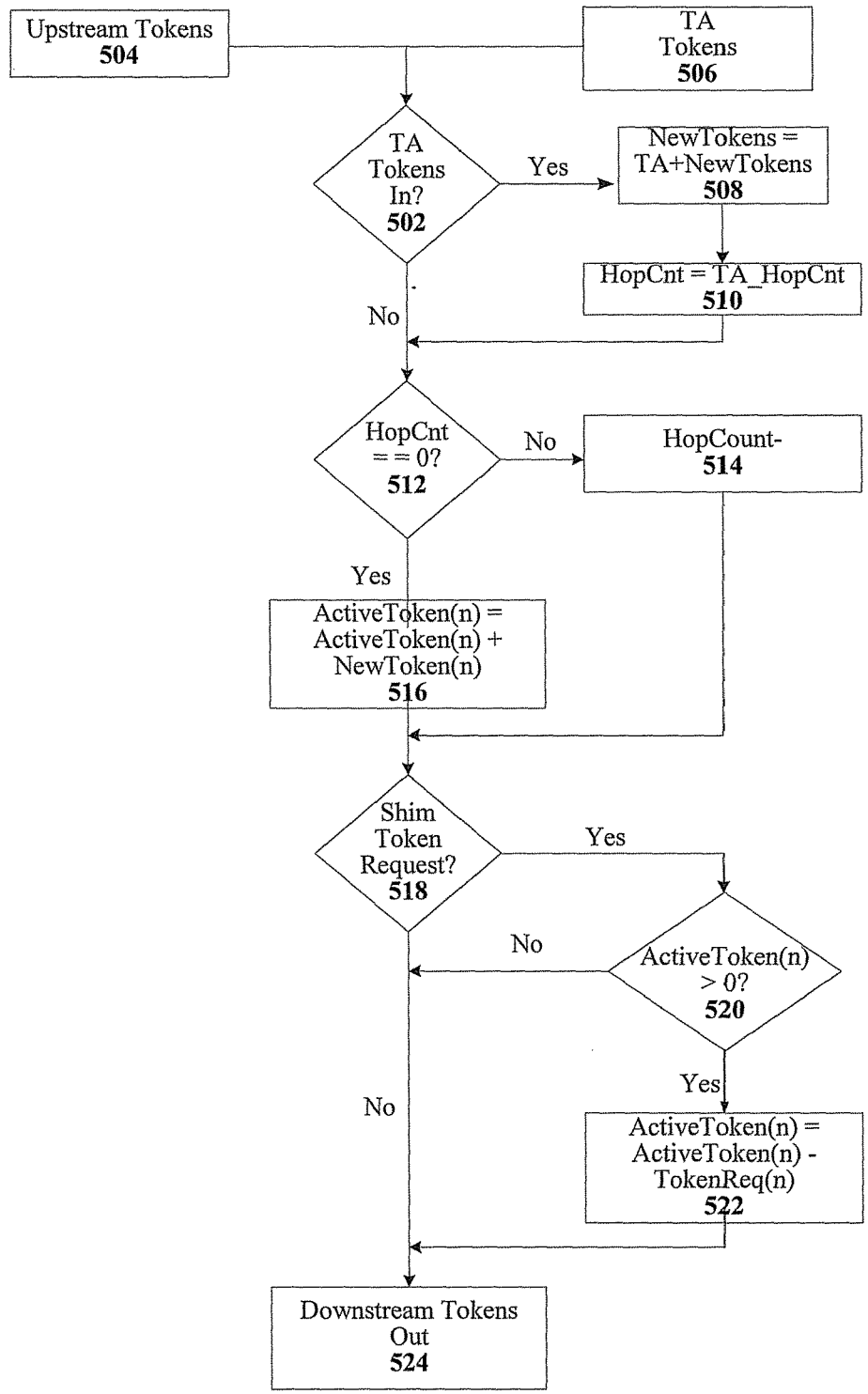
FIG. 5 illustrates an example, non-limiting token processing method, according to an aspect.

FIG. 5 illustrates an example, non-limiting token processing method 500, according to an aspect. Upstream tokens can be received and registered every clock cycle, or at a different frequency. Tokens received from the TA can be read from asynchronous FIFO as the tokens become available. The tokens can be processed and any needed tokens can be claimed. The result is forwarded to the downstream shim in the next clock cycle. The latency can be, for example, two AXI clocks for each shim in the chain.

At 502, one or more tokens are received and a determination is made related to where the respective token was received from. The received tokens can be an upstream token 504 and/or a TA token 506. The upstream tokens 504 are tokens received from the shim or agent located at a position earlier in the token stream (e.g., third shim 210 receives token from second shim 208 of FIG. 2). The TA tokens 506 are tokens received from the token allocator (e.g., TA 202 of FIG. 2).

If the determination, at 502, is that the received token is the TA Token 506 ("Yes"), at 508, the new tokens are equal to the TA plus the new tokens. At 510, the hop count is equal to the TA hop count. If the determination, at 502, is that the received token is the upstream token 504 ("No"), method 500 continues, at 512. Method 500 also continues at 512 after the hop count is set, at 510.

At 512, a determination is made whether the hop count is zero. If the hop count is not zero ("No"), the hop count is incremented, at 514. If the determination at 512 is that the hop count is zero ("Yes"), at 516 the Active Token(n) is equal to ActiveToken(n) plus NewToken(n).

After 514 and/or 516, method 500 continues, at 518, when a determination is made whether there is a shim token request. If there is a shim token request ("Yes"), at 520 a determination is made whether the ActiveToken(n) is greater than zero. If greater than zero ("Yes"), at 522, ActiveToken (n) is equal to ActiveToken(n) minus TokenReq(n).

If the determination at 518 is that it is not a shim token request ("No"), method 500 continues at 524. Further, if the determination at 520 is that ActiveToken(n) is not more than zero ("No"), or after 522, method 500 also continues at 524. Downstream tokens are sent out, at 524. The downstream tokens are sent to the next shim or agent in the token ring.

In accordance with an implementation, tokens can be added to the ring by a shim when HopCnt is equal to zero. In this case, each set of Active_Token counts (e.g., Active_Token0, Active_Token1, and so on) can be increased by the corresponding New_Token counts and the New_Token counts can be reset to zero. Subsequent hops, where HopCnt is still zero, can continue to add New_Token counts to Active_Token counts. However, since New_Token was reset to zero previously, this might not change Active_Token.

When new tokens are injected, the shim can update the HopCnt and the New_Token counts received from the upstream shim with the HopCnt and New_Token counts from the TA message.

In some implementations, tokens can be claimed by a shim when the associated Active_Token(n) count is non-zero. In this case, the shim can be allowed to claim one or more tokens from each Active_Token(n) pool.

A shim might only claim a single VC token from an Active_Token pool when a request is pending in the shim. However, the shim might support prefetching up to a number of tokens, such as, for example, five tokens. This capability can be utilized for the guaranteed bandwidth ports (e.g., 10 Gbit Ethernet) and the high bandwidth ports (e.g., x4 and x8 PCIe Gen3 ports). The capability can be enabled by software through configuration CSRs in the master shim, for example.

Each VC channel can include on output, vc<n>_token_avail, and two inputs vc<n>_token_required and vc<n>_token_consumed. There can be two of these, one for the read channel and one for the write channel. Example, non-limiting signals are provided in Table 4 below.

TABLE 4

| Port Name | Type | Description |
|---|---|---|
| vc<n>_token_avail | Output | Indicates one or more tokens for the associated VC is available for use by the read channel or write channel VC FIFO logic. This signal is a level and negates when there are no tokens available. |
| vc<n>_token_request_rd | Input | Indicates that the read channel is requesting a VC token. This signal is a strobe and asserts when a request is received into one of the VC FIFOs. |
| vc<n>_token_consumed_rd | Input | Indicates that the read channel has consumed a VC token. This signal is a strobe and asserts when a request is delivered to the IOF. |
| vc<n>_token_request_wr | Input | Indicates that the write channel is requesting a VC token. This signal is a strobe and asserts when a request is received into one of the VC FIFOs. |
| vc<n>_token_consumed_wr | Input | Indicates that the write channel has consumed a VC token. This signal is a strobe and asserts when a request is delivered to the IOF. |

The token management logic can retain three counts, for example. These three counts can be for tokens claimed, read tokens pending, and write tokens pending. The tokens claimed count can be incremented when tokens are claimed from the ring and decremented with either the read token consumed strobe or the write token consumed strobe is asserted. The tokens pending counts can be incremented when the associated (read or write) token request strobe is asserted and decremented when the associated token consumed strobe is asserted.

The tokens claimed and the two tokens pending counts can be compared and the result can drive the token available signal. If the tokens claimed count is greater than the read tokens pending count and the write tokens pending count, the token available signal can be asserted. Otherwise, the tokens available signal can be negated.

These counts can also be used to determine if tokens can be prefetched from the token ring. Table 5 below is an example, non-limiting representation of a determination of whether tokens can be prefetched.

TABLE 5

| Condition | Prefetch Enable | Fetch Tokens From Ring | Count of Tokens to Fetch |
|---|---|---|---|
| Tokens Pending = < Tokens Claimed | No | No | N/A |
| Tokens Pending > Tokens Claimed | No | Yes | Tokens Pending-Tokens Claimed. |
| (Tokens Pending + Prefetch Threshold) = < Tokens Claimed | Yes | No | N/A |
| (Tokens Pending + Prefetch Threshold) > Tokens Claimed | Yes | Yes | Prefetch Count-Tokens Claimed. |

In Table 5, Tokens Pending is the sum of the Read Tokens Pending and the Write Tokens Pending (Tokens Pending=Read Tokens Pending+Write Tokens Pending).

It is noted that although the token management logic might use (Prefetch Count−Token Claims) tokens from the ring, the actual number of tokens claimed can be dependent upon the number of tokens available on the ring.

According to an aspect, there might be situations where both the read channel and the write channel simultaneously request a token by asserting their respective vc<n>_token_request_rd/wr strobes while a single token is available in the token management logic. In either case, either the read channel or the write channel can send a request to the IOF without actually obtaining a token.

The above described case can be resolved when either later asserts their respective vc<n>_token_consumed strobe. Each strobe, or both strobes together, can cause the tokens claimed count to decrement by 1 (or 2 if both strobes occur on the same clock). However, if the decrement operation will cause the count to go negative, the count can be reset to zero and an underflow flag can be set. This flag can cause the token management logic to request one additional token from the token ring to account for the transaction sent to the IOF without an actual token from the token management logic.

Figure 6:
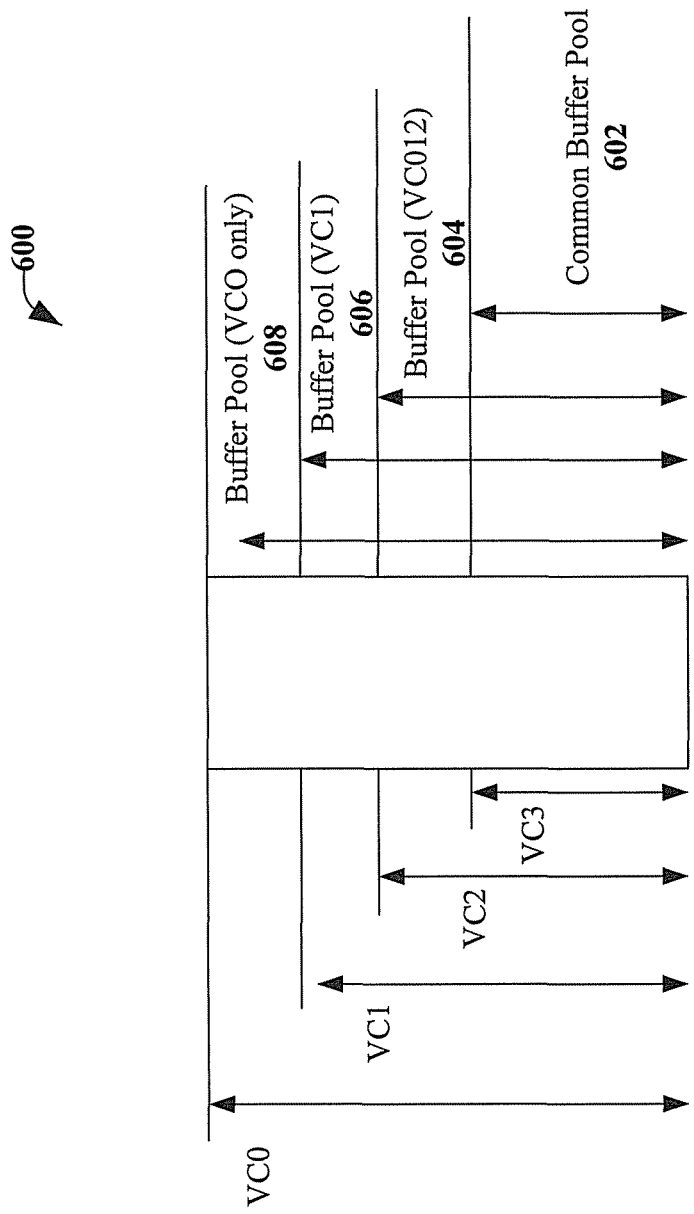
FIG. 6 illustrates an example, non-limiting representation of a free pool manager, according to an aspect.

FIG. 6 illustrates an example, non-limiting representation of a free pool manager 600, according to an aspect. As discussed, the requests can be divided into four or more different classes of services. In order to provide slots for the high priority requests (e.g., non-blocking), the buffer pool can be divided into four sections. A first buffer pool can be a common buffer pool 602 and all requests (e.g., Class 0 (VC0), Class 1 (VC1), Class 2 (VC2); and Class 3 (VC3)) can pull slots from the common buffer pool 602 before pulling slots from other buffer pools. As requests are received, the requests begin to fill the common buffer pool 602. When the common buffer pool 602 is full, VC3 requests no longer have slots available and, therefore, the sending of VC3 requests is stopped until slots open up in the common buffer pool 602.

At about the same time as the common buffer pool 602 is full, a second buffer pool 604 beings to fill up. The second buffer pool 604 can be used by VC0, VC1, and VC2 requests. At about the same time as the second buffer pool 604 is filled up (e.g., all slots used), VC2 requests are stopped (e.g., no more slots are available for the VC2 requests).

The third buffer pool 606 can be used by VC0 and VC1 requests (e.g., VC2 and VC3 requests cannot use the third buffer pool 606). At about the same time as the third buffer pool 606 no longer has slots available, VC1 requests are no longer sent (e.g., there are no slots available for VC1 requests). A fourth buffer pool 608 can be used by the high priority VC0 requests only. In this way, there is still room for the high priority requests and, thus, are not blocked by lower priority requests.

If a slot opens in the common buffer pool 602 and a low priority request is received first, the low priority request can use the slot. However, in the case where there is a slot available in the common buffer pool 602 and also a slot available in the fourth buffer pool 608, and the request received is a high priority request, the high priority requests takes the slot in the common buffer pool 602. This still leaves at least one slot available for another high priority (VC0) request.

In view of the example systems shown and described herein, methods that may be implemented in accordance with the one or more of the disclosed aspects, will be better understood with reference to the following flow charts. While, for purposes of simplicity of explanation, the methods are shown and described as a series of blocks, it is to be understood that the disclosed aspects are not limited by the number or order of blocks, as some blocks may occur in different orders and/or at substantially the same time with other blocks from what is depicted and described herein. Moreover, not all illustrated blocks may be required to implement the methods described hereinafter. It is noted that the functionality associated with the blocks may be implemented by software, hardware, a combination thereof or any other suitable means (e.g. device, system, process, component). Additionally, it is also noted that the methods disclosed hereinafter and throughout this specification are capable of being stored on an article of manufacture to facilitate transporting and transferring such methodologies to various devices. Those skilled in the art will understand that a method could alternatively be represented as a series of interrelated states or events, such as in a state diagram. The various methods disclosed herein can be performed by a system comprising at least one processor.

Figure 7:
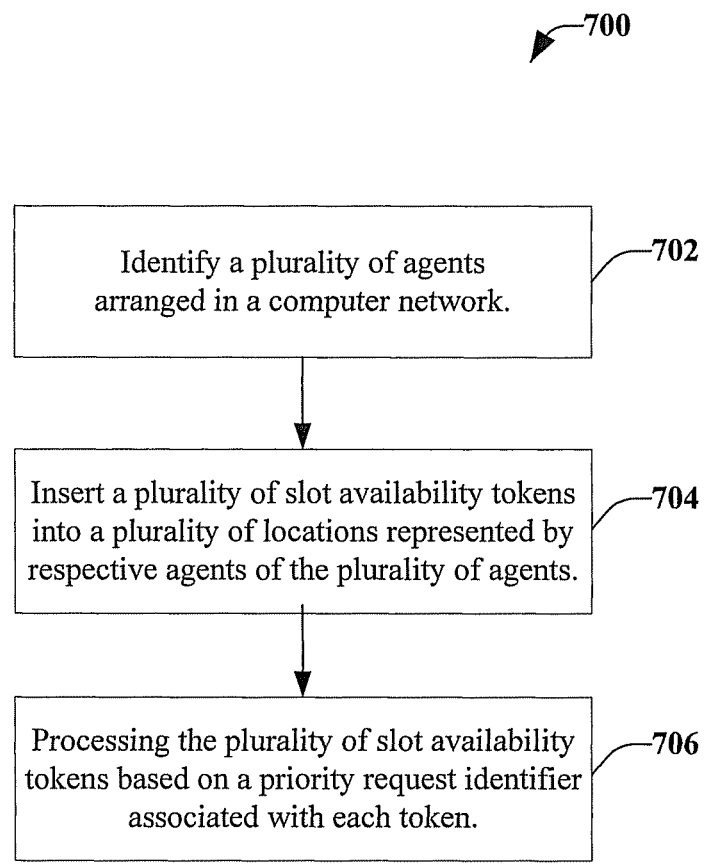
FIG. 7 illustrates an example, non-limiting method for end-to-end flow control in system on chip interconnects, according to an aspect.

FIG. 7 illustrates an example, non-limiting method 700 for end-to-end flow control in system on chip interconnects, according to an aspect. Method starts, at 702, where a plurality of agents arranged in a computer network are identified. For example, the agents can be identified by referencing a table or database, such as example Table 1 provided above. According to an implementation, identifying the plurality of agents includes selecting a first agent and at least a second agent from the plurality of agents.

At 704, a plurality of slot availability tokens are inserted into a plurality of locations represented by respective agents of the plurality of agents. According to an implementation, inserting the tokens can include injecting a first slot availability token into the token ring topology at the first agent and injecting a second slot availability token into the token ring topology at the second agent. The first slot availability token and the second availability token can comprise respective priority request identifiers.

At 706, the first token and the second token are processed based on its priority request identifier. For example, each priority request identifier can include a priority request level and the first token and the second token can be processed in an order based on its priority request level. Further to this example, the priority request level can be one of a high priority request, a medium priority request, and a low priority request.

According to an implementation, the plurality of slot availability tokens can be inactive when inserted into the plurality of locations. For example, the first slot availability token can be activated in response to an occurrence of a first event and the second slot availability token can be activated in response to the occurrence of a second event. Further to this example, the first event can be a first predefined set of hops measured from the first agent and the second event can be a second predefined set of hops measured from the second agent. According to an implementation, the predefined set of hops can be determined based on information retained in a database or a table, such as example Table 1 discussed above.

In another implementation, the method can include applying a first activation rule to the first slot availability token. The first activation rule can define a first condition for activation of the first token. In an example, the first condition can be a number of hops defined with respect to the first agent. According to another implementation, the method can include applying a second activation rule to the second slot availability token, wherein the second activation rule defines a second condition for activation of the second token. In an example, the second condition can be number of hops defined with respect to the second agent.

In a further implementation, the method can include defining memory partitions for outstanding requests received from the plurality of agents. The outstanding requests can be divided into a plurality of groups. For example, the outstanding requests can be divided into a first group, a second group, a third group, and a fourth group.

Figure 8:
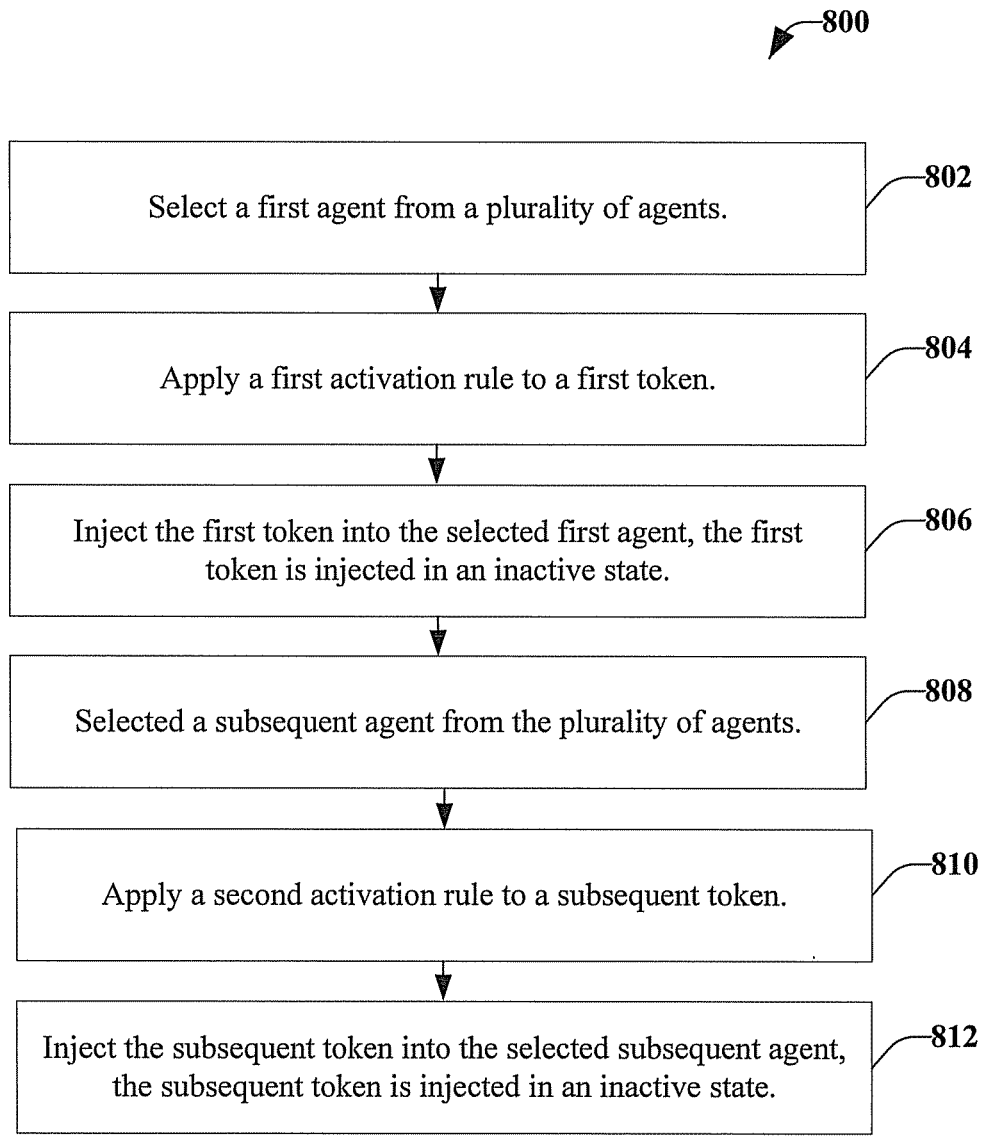
FIG. 8 illustrates an example, non-limiting method for flow control in system on chip interconnects, according to an aspect.

FIG. 8 illustrates an example, non-limiting method 800 for flow control in system on chip interconnects, according to an aspect. At 802, a first agent is selected from a plurality of agents arranged in a computer network. The first agent can be selected based on predefined criteria, such as a table that defines an order in which the tokens should be injected. In another example, the first agent can be selected based on its location with respect to other agents (e.g., if a previous token was injected at agent A, the next token (e.g., first token) is injected at agent B). According to some aspects, the first agent is selected randomly.

At 804, an activation rule is applied to a first token. The activation rule defines a condition for activation of the first token. According to an implementation, the condition can be a number of hops defined with respect to the first agent. The first token is injected into the first agent at 806. In an example, injecting the first token comprises injecting the first token in an inactive state.

Further, at 808, a second (or subsequent) agent is selected from the plurality of agents. The second agent is different from the first agent. According to an implementation, a subsequent agent can be different from the first agent. However, according to other implementations, the second (or subsequent) agent can be the first agent (e.g., to prefer an agent over the other agents).

At 810, an activation rule is applied to the second (or subsequent) token. The activation rule can define a condition for activation of the second token. At about the same time as the activation rule(s) are determined to be satisfied, the token can be activated and can be used by the agent. For example, if the activation rule applies to a number of hops that are to occur, after the number of hops is reached, a next agent (after the hop that satisfied the rule) can selectively accept the token, or pass the token to another agent in the computer network.

At 812, a second (or subsequent) token is injected into the second agent. In an example, injecting the second (or subsequent) token comprises injecting the second (or subsequent) token in an inactive state.

In an implementation, the first token and the second token represent respective available slots for transmission of a request to a memory chip. For example, the method 800 can include defining resource pools for outstanding requests received from the plurality of agents. The outstanding requests can be divided into a first group, a second group, a third group, and a fourth group.

In an implementation, defining the resource pools can include reserving a first pool for the first group and reserving a second pool for the first group and the second group. Further to this implementation, a third pool can be reserved for the first group, the second group, and the third group and a fourth pool can be reserved for the first group, the second group, the third group, and the fourth group.

The first group can be a higher priority than the second group, the third group, and the fourth group (e.g., VC0). The second group can be a higher priority than the third group and the fourth group (e.g., VC1). Further, the third group can be a higher priority than the fourth group (e.g., VC2).

Figure 9:
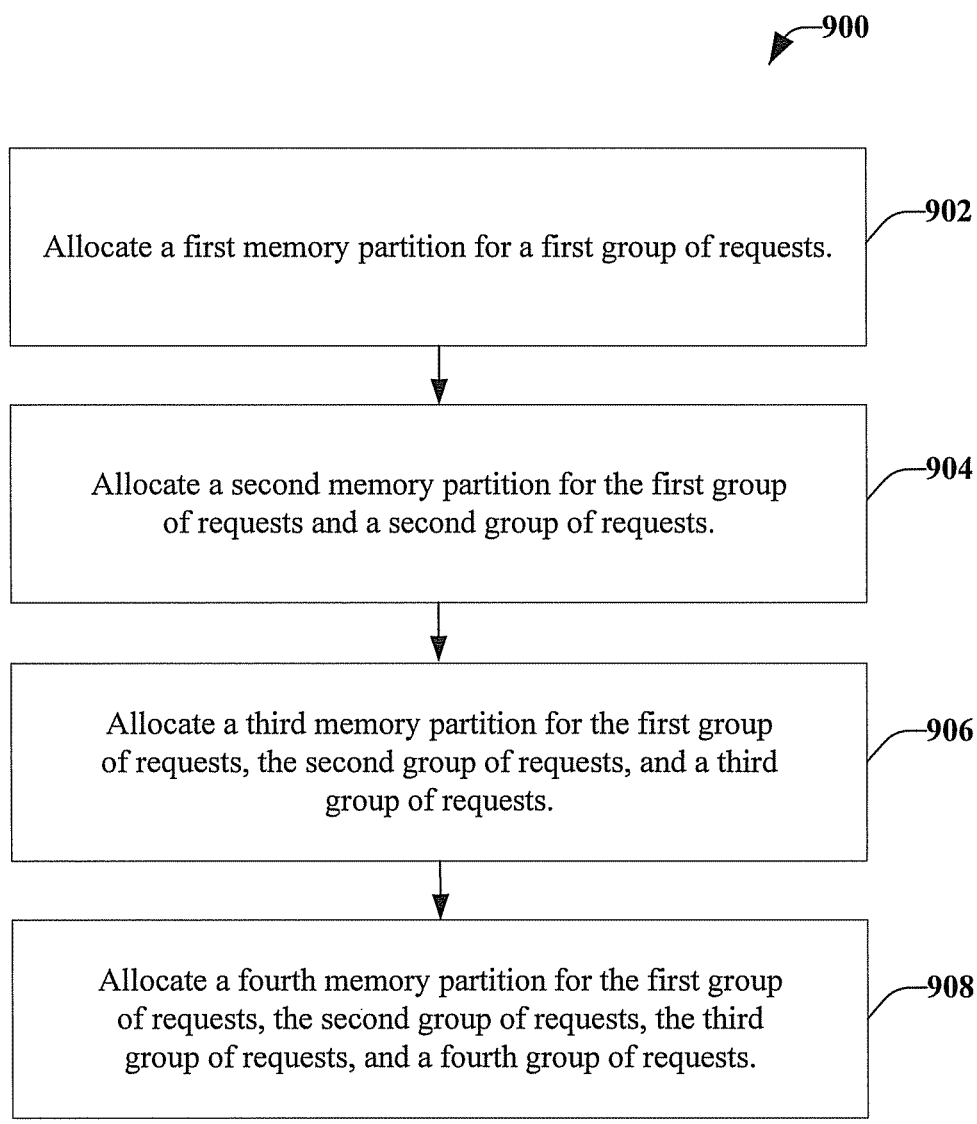
FIG. 9 illustrates an example, non-limiting method for memory partition in a system on chip interface, according to an aspect.

FIG. 9 illustrates an example, non-limiting method 900 for memory partition in a system on chip interface, according to an aspect. Method 900 can be configured to keep high priority slots available by consuming lower priority slots first. Method 900 can include defining partitions for outstanding requests. In an implementation, the outstanding requests can be divided into a first group of requests, a second group of requests, a third group of requests, and a fourth group of requests, although another number of groups can be utilized with the disclosed aspects.

According to an example, the first group of requests is a higher priority than the second group of requests, the third group of requests, and the fourth group of requests. Further, the second group of requests is a higher priority than the third group of requests and the fourth group of requests. Further to this example, the third group of requests is a higher priority than the fourth group of requests.

At 902, a first memory partition is allocated for the first group of requests. For example, the first memory partition can be reserved for the first group of requests. A second memory partition is allocated for first group of requests and the second group of requests, at 904. For example, the second memory partition can be reserved for the first group of requests and the second group of requests.

Further, at 906, a third memory partition is allocated for the first group of requests, the second group of requests, and the third group of requests. For example, the third memory partition can be reserved for the first group of requests, the second group of requests, and the third group of requests. At 908, a fourth memory partition is allocated for the first group of requests, the second group of requests, the third group of requests, and the fourth group of requests. For example, the fourth memory partition can be reserved for the first group of requests, the second group of requests, the third group of requests, and the fourth group of requests.

According to an implementation, the method 900 can include selecting a first agent from a plurality of agents, wherein the plurality of agents are arranged in a ring topology. The first token is injected into the first agent. Further, the method 900 can include selecting a second agent from the plurality of agents, wherein the second agent is different from the first agent. A second token is injected into the second agent. Further to this implementation, the first token and the second token represent respective available slots for transmission of a request defined by one of the first group of requests, the second group of requests, the third group of requests, and the fourth group of requests.

As discussed herein aspects relate to controlling token injection points to improve latency and to increase fairness. Additionally or alternatively, various aspects relate to injecting inactive tokens (at a same point in the token ring or at multiple points) to increase fairness or to introduce bias. Additionally or alternatively, one or more aspects relate to consuming low priority slots first to provide for non-blocking of high priority requests.

Example Computing Environment

The various aspects described herein can be applied to any device where it is desirable to facilitate end-to-end flow control in a SoC interconnect fabric. It is to be understood, therefore, that handheld, portable and other computing devices and computing objects of all kinds are contemplated for use in connection with the various non-limiting embodiments (e.g., anywhere that a device may wish to share computing resources with a plurality of guest devices or virtual machines). Accordingly, the general purpose remote computer described herein is but one example, and the disclosed subject matter can be implemented with any client having network/bus interoperability and interaction. Thus, the disclosed subject matter can be implemented in an environment of networked hosted services in which very little or minimal client resources are implicated, such as, for example, a networked environment in which the client device serves merely as an interface to the network/bus, such as an object placed in an appliance.

Although not required, some aspects of the disclosed subject matter can partly be implemented via an operating system, for use by a developer of services for a device or object, and/or included within application software that operates in connection with the component(s) of the disclosed subject matter. Software may be described in the general context of computer executable instructions, such as program modules or components, being executed by one or more computer(s), such as projection display devices, viewing devices, or other devices. Those skilled in the art will appreciate that the disclosed subject matter may be practiced with other computer system configurations and protocols.

Figure 10:
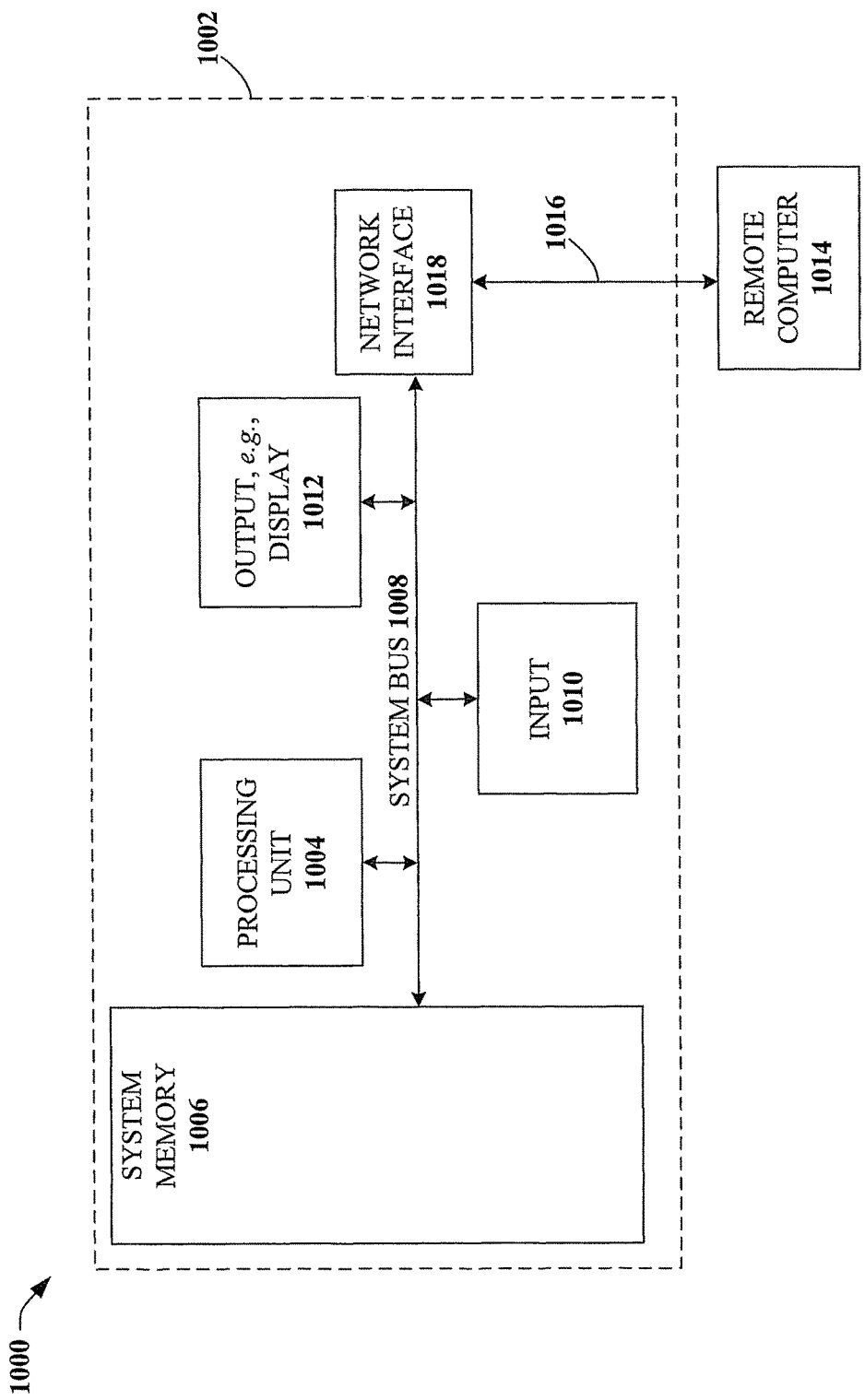
FIG. 10 illustrates a block diagram of an example electronic computing environment that can be implemented in conjunction with one or more aspects described herein.

FIG. 10 illustrates an example of a suitable computing system environment 1000 in which some aspects of the disclosed subject matter can be implemented. The computing system environment 1000 is only one example of a suitable computing environment for a device and is not intended to suggest any limitation as to the scope of use or functionality of the disclosed subject matter. Neither should the computing system environment 1000 be interpreted as having any dependency or requirement relating to any one or combination of components illustrated in the exemplary operating system environment 1000.

With reference to FIG. 10, an exemplary device for implementing the disclosed subject matter includes a general-purpose computing device in the form of a computer 1002. Components of computer 1002 may include, but are not limited to, a processing unit 1004, a system memory 1006, and a system bus 1008 that couples various system components including the system memory 1006 to the processing unit 1004. The system bus 1008 may be any of several types of bus structures including a memory bus or memory controller, a peripheral bus, and a local bus using any of a variety of bus architectures.

Computer 1002 can include a variety of media, which can include computer-readable storage media or communications media, which two terms are used herein differently from one another as follows.

Computer-readable storage media can be any available storage media that can be accessed by the computer 1002 and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, random access memory, read only memory, electrically erasable programmable read only memory, flash memory or other memory technology, compact disk read only memory, digital versatile disk or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

According to an implementation, a computer program product comprises a non-transitory medium storing programs for execution by one or more computing systems. The computer program product can comprise code for selecting a first agent and a second agent from a plurality of agents. The computer program product can also comprise code for injecting a first token into the first agent and a second token into the second agent. The first token and the second token can comprise respective priority request identifiers. The computer program product can also include code for processing the first token and the second token based on its priority request identifier.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

The system memory 1006 can include computer storage media in the form of volatile and/or nonvolatile memory such as read only memory (ROM) and/or random access memory (RAM). A basic input/output system (BIOS), containing the basic routines that help to transfer information between elements within computer 1002, such as during start-up, can be stored in memory 1006. Memory 1006 can also contain data and/or program modules that are immediately accessible to and/or presently being operated on by processing unit 1004. By way of example, and not limitation, memory 1006 may also include an operating system, application programs, other program modules, and program data.

The computer 1002 may also include other removable/non-removable, volatile/nonvolatile computer storage media. For example, computer 1002 could include a hard disk drive that reads from or writes to non-removable, nonvolatile magnetic media, a magnetic disk drive that reads from or writes to a removable, nonvolatile magnetic disk, and/or an optical disk drive that reads from or writes to a removable, nonvolatile optical disk, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. A hard disk drive can be connected to the system bus 1008 through a non-removable memory interface, and a magnetic disk drive or optical disk drive is connected to the system bus 1008 by a removable memory interface, such as an interface.

A user can enter commands and information into the computer 1002 through input devices such as a keyboard and pointing device, commonly referred to as a mouse, trackball, or touch pad. Other input devices can include a microphone, joystick, game pad, satellite dish, scanner, wireless device keypad, voice commands, or the like. These and other input devices can be connected to the processing unit 1004 through user input 1010 and associated interface(s) that are coupled to the system bus 1008, but may be connected by other interface and bus structures, such as a parallel port, game port, or a universal serial bus (USB). A graphics subsystem can also be connected to the system bus 1008. A projection unit in a projection display device, or a HUD in a viewing device or other type of display device can also be connected to the system bus 1008 via an interface, such as an output interface 1012, which may in turn communicate with video memory. In addition to a monitor, computers can also include other peripheral output devices such as speakers, which can be connected through output interface 1012.

The computer 1002 can operate in a networked or distributed environment using logical connections to one or more other remote computer(s), such as remote computer 1014, which can have media capabilities different from computer 1002. The remote computer 1014 can be a personal computer, a server, a router, a network PC, a peer device, personal digital assistant (PDA), cell phone, handheld computing device, a projection display device, a viewing device, or other network node, or any other remote media consumption or transmission device, and may include any or all of the elements described above relative to the computer 1002. The logical connections depicted in FIG. 10 include a network 1016, such as a local area network (LAN) or a wide area network (WAN), but can also include other networks/buses, either wired or wireless. Such networking environments can be used in homes, offices, enterprise-wide computer networks, intranets and the Internet.

When used in a LAN networking environment, the computer 1002 can be connected to the LAN 1016 through a network interface 1018 or adapter. When used in a WAN networking environment, the computer 1002 can include a communications component, such as a modem, or other means for establishing communications over the WAN, such as the Internet. A communications component, such as wireless communications component, a modem and so on, which can be internal or external, can be connected to the system bus 1008 via the user input interface of input 1010, or other appropriate mechanism. In a networked environment, program modules depicted relative to the computer 1002, or portions thereof, can be stored in a remote memory storage device. It will be appreciated that the network connections shown and described are exemplary and other means of establishing a communications link between the computers can be used.

Example Networking Environment

Figure 11:
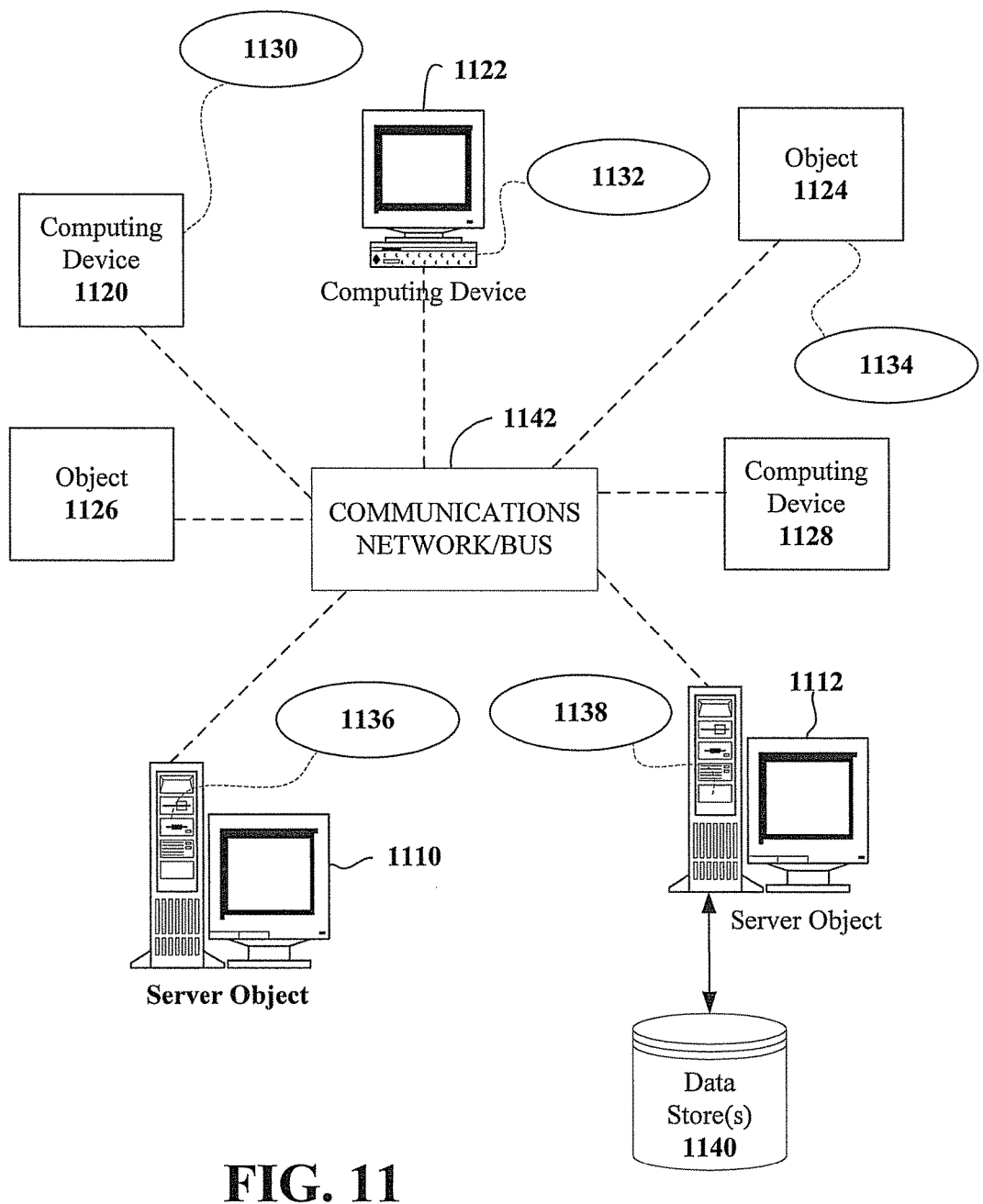
FIG. 11 illustrates a block diagram of an example data communication network that can be operable in conjunction with various aspects described herein.

FIG. 11 is a schematic diagram of an exemplary networked or distributed computing environment. The distributed computing environment comprises computing objects 1102, 1104, etc. and computing objects or devices 1106, 1108, 1110, 1112, 1114, etc., which may include programs, methods, data stores, programmable logic, etc., as represented by applications 1116, 1118, 1120, 1122, 1124 and data store(s) 1126. It can be appreciated that computing objects 1102, 1104, etc. and computing objects or devices 1106, 1108, 1110, 1112, 1114, etc. may comprise different devices, including a multimedia display device or similar devices, or other devices such as a mobile phone, personal digital assistant (PDA), audio/video device, MP3 players, personal computer, laptop, etc. It should be further appreciated that data store(s) 1126 can include at least one memory, such as at least one memory 104 of FIG. 1, or other data stores.

Each computing object of the computing objects 1102, 1104, etc. and computing objects or devices 1106, 1108, 1110, 1112, 1114, etc. can communicate with one or more other computing objects 1102, 1104, etc. and computing objects or devices 1106, 1108, 1110, 1112, 1114, etc. by way of the communications network 1128, either directly or indirectly. Even though illustrated as a single element in FIG. 11, communications network 1128 may comprise other computing objects and computing devices that provide services to the system of FIG. 11, and/or may represent multiple interconnected networks, which are not shown. Each computing object of the computing objects 1102, 1104, etc. or computing object or devices 1106, 1108, 1110, 1112, 1114, etc. can also contain an application, such as applications 1116, 1118, 1120, 1122, 1124, that might make use of an API, or other object, software, firmware and/or hardware, suitable for communication with or implementation of the techniques and disclosure described herein.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, although any network infrastructure can be used for exemplary communications made incident to the systems automatic diagnostic data collection as described in various embodiments herein.

Thus, a host of network topologies and network infrastructures, such as client/server, peer-to-peer, or hybrid architectures, can be utilized. The "client" is a member of a class or group that uses the services of another class or group to which it is not related. A client can be a process, for example, roughly a set of instructions or tasks, that requests a service provided by another program or process. The client process utilizes the requested service, in some cases without having to "know" any working details about the other program or the service itself.

In a client/server architecture, particularly a networked system, a client is usually a computer that accesses shared network resources provided by another computer, e.g., a server. In the illustration of FIG. 11, as a non-limiting example, computing objects or devices 1106, 1108, 1110, 1112, 1114, etc. can be thought of as clients and computing objects 1102, 1104, etc. can be thought of as servers where computing objects 1102, 1104, etc., acting as servers provide data services, such as receiving data from client computing objects or devices 1106, 1108, 1110, 1112, 1114, etc., storing of data, processing of data, transmitting data to client computing objects or devices 1106, 1108, 1110, 1112, 1114, etc., although any computer can be considered a client, a server, or both, depending on the circumstances.

A server can be a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the techniques described herein can be provided standalone, or distributed across multiple computing devices or objects.

In a network environment in which the communications network 1128 or bus is the Internet, for example, the computing objects 1102, 1104, etc. can be Web servers with which other computing objects or devices 1106, 1108, 1110, 1112, 1114, etc. communicate via any of a number of known protocols, such as the hypertext transfer protocol (HTTP). Computing objects 1102, 1104, etc. acting as servers may also serve as clients, e.g., computing objects or devices 1106, 1108, 1110, 1112, 1114, etc., as may be characteristic of a distributed computing environment.

Reference throughout this specification to "one embodiment", "an embodiment", "a disclosed aspect", or "an aspect" means that a particular feature, structure, or characteristic described in connection with the embodiment or aspect is included in at least one embodiment or aspect of the present disclosure. Thus, the appearances of the phrase "in one embodiment", "in one aspect", or "in an embodiment" in various places throughout this specification are not necessarily all referring to the same embodiment. Furthermore, the particular features, structures, or characteristics may be combined in any suitable manner in various disclosed embodiments.

As utilized herein, NAND and NOR memory refer to two types of flash memory based on the NAND and NOR logic gates that they respectively use. The NAND type is primarily used in main memory cards, USB flash drives, solid-state drives, and similar products, for general storage and transfer of data. The NOR type, which allows true random access and therefore direct code execution, is used as a replacement for the older EPROM and as an alternative to certain kinds of ROM applications. However, NOR flash memory can emulate ROM primarily at the machine code level; many digital designs need ROM (or PLA) structures for other uses, often at significantly higher speeds than (economical) flash memory may achieve. NAND or NOR flash memory is also often used to store configuration data in numerous digital products, a task previously made possible by EEPROMs or battery-powered static RAM.

As utilized herein, terms "component", "system", "architecture" and the like are intended to refer to a computer or electronic-related entity, either hardware, a combination of hardware and software, software (e.g., in execution), or firmware. For example, a component can be one or more transistors, a memory cell, an arrangement of transistors or memory cells, a gate array, a programmable gate array, an application specific integrated circuit, a controller, a processor, a process running on the processor, an object, executable, program or application accessing or interfacing with semiconductor memory, a computer, or the like, or a suitable combination thereof. The component can include erasable programming (e.g., process instructions at least in part stored in erasable memory) or hard programming (e.g., process instructions burned into non-erasable memory at manufacture).

By way of illustration, both a process executed from memory and the processor can be a component. As another example, an architecture can include an arrangement of electronic hardware (e.g., parallel or serial transistors), processing instructions and a processor, which implement the processing instructions in a manner suitable to the arrangement of electronic hardware. In addition, an architecture can include a single component (e.g., a transistor, a gate array, . . . ) or an arrangement of components (e.g., a series or parallel arrangement of transistors, a gate array connected with program circuitry, power leads, electrical ground, input signal lines and output signal lines, and so on). A system can include one or more components as well as one or more architectures. One example system can include a switching block architecture comprising crossed input/output lines and pass gate transistors, as well as power source(s), signal generator(s), communication bus(ses), controllers, I/O interface, address registers, and so on. It is to be appreciated that some overlap in definitions is anticipated, and an architecture or a system can be a stand-alone component, or a component of another architecture, system, etc.

In addition to the foregoing, the disclosed subject matter can be implemented as a method, apparatus, or article of manufacture using manufacturing, programming or engineering techniques to produce hardware, firmware, software, or any suitable combination thereof to control an electronic device to implement the disclosed subject matter. The terms "apparatus" and "article of manufacture" where used herein are intended to encompass an electronic device, a semiconductor device, a computer, or a computer program accessible from any computer-readable device, carrier, or media. Computer-readable media can include hardware media, or software media. In addition, the media can include non-transitory media, or transport media. In one example, non-transitory media can include computer readable hardware media. Specific examples of computer readable hardware media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Computer-readable transport media can include carrier waves, or the like. Of course, those skilled in the art will recognize many modifications can be made to this configuration without departing from the scope or spirit of the disclosed subject matter.

What has been described above includes examples of the subject innovation. It is, of course, not possible to describe every conceivable combination of components or methodologies for purposes of describing the subject innovation, but one of ordinary skill in the art can recognize that many further combinations and permutations of the subject innovation are possible. Accordingly, the disclosed subject matter is intended to embrace all such alterations, modifications and variations that fall within the spirit and scope of the disclosure. Furthermore, to the extent that a term "includes", "including", "has" or "having" and variants thereof is used in either the detailed description or the claims, such term is intended to be inclusive in a manner similar to the term "comprising" as "comprising" is interpreted when employed as a transitional word in a claim.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Additionally, some portions of the detailed description have been presented in terms of algorithms or process operations on data bits within electronic memory. These process descriptions or representations are mechanisms employed by those cognizant in the art to effectively convey the substance of their work to others equally skilled. A process is here, generally, conceived to be a self-consistent sequence of acts leading to a desired result. The acts are those requiring physical manipulations of physical quantities. In an example, though not necessarily, these quantities take the form of electrical and/or magnetic signals capable of being stored, transferred, combined, compared, and/or otherwise manipulated.

It has proven convenient, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Unless specifically stated otherwise or apparent from the foregoing discussion, it is appreciated that throughout the disclosed subject matter, discussions utilizing terms such as processing, computing, calculating, determining, or displaying, and the like, refer to the action and processes of processing systems, and/or similar consumer or industrial electronic devices or machines, that manipulate or transform data represented as physical (electrical and/or electronic) quantities within the registers or memories of the electronic device(s), into other data similarly represented as physical quantities within the machine and/or computer system memories or registers or other such information storage, transmission and/or display devices.

In regard to the various functions performed by the above described components, architectures, circuits, processes and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the embodiments. In addition, while a particular feature may have been disclosed with respect to only one of several implementations, such feature may be combined with one or more other features of the other implementations as may be desired and advantageous for any given or particular application. It will also be recognized that the embodiments include a system as well as a computer-readable medium having computer-executable instructions for performing the acts and/or events of the various processes.

Other than where otherwise indicated, all numbers, values and/or expressions referring to quantities of items such as memory size, etc., used in the specification and claims are to be understood as modified in all instances by the term "about."

What is claimed is:

1. A system, comprising:
a processor configured to select a first agent and a second agent from a plurality of agents of a token ring in a computer network, wherein the first agent and the second agent are different than a set of agents previously selected from the plurality of agents;
a token allocator configured to inject a first token comprising a first priority request identifier into the first agent and a second token comprising a second priority request identifier into the second agent, the first priority request identifier comprises a first priority and the second priority request identifier comprises a second priority, and
a memory configured to define resource pools for outstanding requests received from the plurality of agents, the outstanding requests being divided into a plurality of groups;
wherein the processor randomly selects the first agent from the plurality of agents to be an injection point for injecting the first token into the token ring and the second agent from the plurality of agents to be an injection point for injecting the second token into the token ring to facilitate randomly alternating injection points for injecting tokens among respective agents of the token ring, and wherein the first token and the second token circulate sequentially through the plurality of agents in the token ring, and
wherein the processor is further configured to process a first request from a first claiming agent of the plurality of agents before a second request from a second claiming agent of the plurality of agents based on the first priority request identifier and the second priority request identifier, wherein the first priority request identifier indicates that the first request associated with the first token has a higher priority than the second request associated with the second token, and wherein the first claiming agent is the first agent or a different agent of the plurality of agents, and the second claiming agent is the second agent or another agent of the plurality of agents; and wherein the resource pools comprise a first resource pool, a second resource pool, a third resource pool, and a fourth resource pool, and wherein the memory is further configured to reserve the first resource pool for a first group, reserve the second resource pool for the first group and a second group, reserve the third resource pool for the first group, the second group, and a third group, and reserve the fourth resource pool for the first group, the second group, the third group, and a fourth group.

2. The system of claim 1, wherein the respective priority request identifiers comprise respective priority request levels, and wherein the processor is configured to process the first token and the second token in an order based on the first priority request identifier indicating a first priority request level that is higher than a second priority request level indicated by the second priority request identifier.

3. The system of claim 2, wherein the first priority request level is one of a high priority request or a medium priority request, and wherein the second priority request level is different from the first priority request level and is one of the medium priority request or a low priority request.

4. The system of claim 1, wherein the first token and the second token represent respective available slots for transmission of the first request and the second request, respectively, to a memory chip from the plurality of agents.

5. The system of claim 1, wherein the token allocator is configured to inject the first token in an inactive state.

6. The system of claim 1, wherein the token allocator is configured to inject the first token in an inactive state, and wherein the processor is configured to apply an activation rule to the first token, the activation rule defining a condition for activation of the first token.

7. The system of claim 6, wherein the condition comprises one or more hops defined with respect to the first agent.

8. The system of claim 1, wherein the token allocator is configured to inject the second token in an inactive state.

9. The system of claim 1, wherein the token allocator is configured to inject the second token in an inactive state, and wherein the processor is configured to apply an activation rule to the second token, the activation rule defining a condition for activation of the second token.

10. The system of claim 9, wherein the condition comprises one or more hops defined with respect to the second agent.

11. The system of claim 1, wherein
the first group is associated with the first priority that is higher than the second priority associated with the second group, a third priority associated with the third group, and a fourth priority associated with the fourth group;
the second priority associated with the second group is higher than the third priority associated with the third group and the fourth priority associated with the fourth group; and
the third priority associated with the third group is higher than the fourth priority associated with the fourth group, wherein slots of the fourth resource pool are utilized for requests associated with at least one of the first group, the second group, the third group, or the fourth group until the fourth resource pool is full before other slots of the third resource pool are utilized for other requests associated with at least one of the first group, the second group, or the third group, and wherein, in response to the fourth resource pool being determined to be full, a portion of the requests associated with the fourth priority are no longer injected into the resource pools.

12. A method comprising:
identifying a first agent and a second agent of a plurality of agents arranged in a token ring in a computer network, the first agent and the second agent being agents in which a first slot availability token and a second slot availability token are configured to be inserted, wherein the first agent and the second agent are different from a set of agents previously selected;
inserting the first slot availability token into the first agent and the second slot availability token into the second agent, wherein the identifying the first agent and the second agent comprises randomly selecting the first agent to be a first injection point for inserting the first slot availability token into the token ring and the second agent to be a second injection point for inserting the second slot availability token into the token ring based on facilitation of randomly altering injection points for inserting the first slot availability token and the second slot availability token into the respective agents of the plurality of agents of the token ring;
circulating the first slot availability token and the second slot availability token through the plurality of agents, wherein the first slot availability token and the second slot availability token are inactive when inserted into the first agent and the second agent, and the first slot availability token and the second slot availability token are claimed by respective requesting agents of the plurality of agents upon a first activation of the first slot availability token and a second activation of the second slot availability token;
processing a first request from a first requesting agent of the respective requesting agents before processing a second request from a second requesting agent of the respective requesting agents in response to the first slot availability token being claimed by the first requesting agent and based on a first priority request identifier associated with the first slot availability token and a second priority request identifier associated with the second slot availability token associated with the second request, wherein the first priority request identifier indicates that the first request associated with the first slot availability token has a higher priority than the second request associated with the second slot availability token; and
defining memory partitions for outstanding requests received from the plurality of agents, wherein the outstanding requests arc divided into a plurality of groups.

13. The method of claim 12, wherein the inserting the first slot availability token and the second slot availability token comprises:
selecting the first agent from the plurality of agents;
injecting the first slot availability token into the computer network at the first agent, wherein the first slot availability token is activated in response to an occurrence of a first event;

selecting the second agent from the plurality of agents; and injecting the second slot availability token into the computer network at the second agent, wherein the second slot availability token is activated in response to the occurrence of a second event.

14. The method of claim 13, wherein the first event comprises a first predefined set of hops measured from the first agent and the second event comprises a second predefined set of hops measured from the second agent.

15. A method comprising:

selecting a first agent and a second agent from a plurality of agents that form a token ring associated with a computer network, wherein the first agent and the second agent are different than a set of agents previously selected from the plurality of agents;

injecting a first token comprising a first priority request identifier into the first agent and a second token comprising a second priority request identifier into the second agent, wherein the first token and the second token circulate sequentially through the plurality of agents in the token ring, and wherein the selecting the first agent and the second agent comprises randomly selecting the first agent to be an injection point for injecting the first token into the token ring and randomly selecting the second agent to be another injection point for injecting the second token into the token ring to facilitate randomly altering injection points for injecting tokens among respective agents of the plurality of agents of the token ring;

processing a first request from a first claiming agent of the plurality of agents before a second request from a second claiming agent of the plurality of agents is processed in response to the first claiming agent claiming the first token and based on the first priority request identifier n and the second priority request identifier, wherein the first priority request identifier indicates the first request associated with the first token has a higher priority level than the second request associated with the second token, and wherein the first claiming agent is the first agent or a different agent of the plurality of agents, and the second claiming agent is the second agent or another agent of the plurality of agents; and defining memory partitions for outstanding requests received from the plurality of agents, wherein the outstanding requests are divided into a plurality of groups.

16. The method of claim 15 wherein respective priority request identifiers comprise respective priority request levels, the method further comprising:

processing the first token and the second token in an order based on the first priority request identifier indicating a first priority request level that is higher than a second priority request level indicated by the second priority request identifier.

17. The method of claim 16, wherein the first priority request level is one of a high priority request or a medium priority request, and wherein the second priority request level is different from the first priority request level and is one of the medium priority request or a low priority request.

18. The method of claim 15, wherein the first token and the second token represent respective available slots for transmission of the first request and the second request, respectively, to a memory chip from the plurality of agents.

19. The method of claim 15, wherein the injecting comprises injecting the first token and the second token in an inactive state, the method further comprising:

applying a first activation rule to the first token, the first activation rule defining a first condition for activation of the first token; and applying a second activation rule to the second token, the second activation rule defining a second condition for activation of the second token.

20. A computer program product, comprising a non-transitory medium storing programs for execution by one or more computing systems, the computer program product comprising:

code for selecting a first agent and a second agent from a plurality of agents that form a token ring associated with a computer network, wherein the first agent and the second agent are different than a set of agents previously selected from the plurality of agents;

code for injecting a first token into the first agent and a second token into the second agent, the first token comprises a first priority request identifier and the second token comprises a second priority request identifier, wherein the first token and the second token circulate sequentially through the plurality of agents in the token ring, wherein the code for selecting the first agent and the second agent comprises code for facilitating dynamically altering injection points for injecting tokens into respective agents of the plurality of agents of the token ring comprising code for randomly selecting the first agent to be an injection point for injecting the first token into the token ring and code for randomly selecting the second agent to be another injection point for injecting the second token into the token ring;

code for processing a first request from a first claiming agent of the plurality of agents before a second request from a second claiming agent of the plurality of agents in response to the first claiming agent claiming the first token and based on the first priority request identifier, wherein the first priority request identifier indicates the first request associated with the first token has a higher priority than the second request associated with the second token, and wherein the first claiming agent is the first agent or a different agent of the plurality of agents, and the second claiming agent is the second agent or another agent of the plurality of agents; and code for defining memory partitions for outstanding requests received from the plurality of agents, wherein the outstanding requests are divided into a plurality of groups.

* * * * *

UNITED STATES PATENT AND TRADEMARK OFFICE
CERTIFICATE OF CORRECTION

PATENT NO. : 10,205,666 B2
APPLICATION NO. : 13/953059
DATED : February 12, 2019
INVENTOR(S) : Mittal et al.

Page 1 of 1

It is certified that error appears in the above-identified patent and that said Letters Patent is hereby corrected as shown below:

In the Claims

Column 26,
Line 58, Claim 12 "outstanding requests arc divided" should read --outstanding requests are divided--.

Signed and Sealed this
Third Day of September, 2019

Andrei Iancu
*Director of the United States Patent and Trademark Office*